US012620189B2

(12) United States Patent
Markhasin et al.

(10) Patent No.: US 12,620,189 B2
(45) Date of Patent: May 5, 2026

(54) METHOD, ELECTRONIC DEVICE AND COMPUTER PROGRAM

(71) Applicant: Sony Semiconductor Solutions Corporation, Kanagawa (JP)

(72) Inventors: Lev Markhasin, Stuttgart (DE); Iheb Belgacem, Stuttgart (DE); Shivangi Aneja, Munich (DE); Matthias Nießner, Munich (DE); Angela Dai, Stuttgart (DE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 167 days.

(21) Appl. No.: 18/521,009

(22) Filed: Nov. 28, 2023

(65) Prior Publication Data

US 2024/0193891 A1     Jun. 13, 2024

(30) Foreign Application Priority Data

Dec. 2, 2022     (EP) .................................... 22211197

(51) Int. Cl.
| | |
|---|---|
| *G06T 19/20* | (2011.01) |
| *G06T 15/04* | (2011.01) |
| *G06T 17/20* | (2006.01) |

(52) U.S. Cl.
CPC .............. G06T 19/20 (2013.01); G06T 15/04 (2013.01); G06T 17/20 (2013.01)

(58) Field of Classification Search
CPC .......... G06T 19/20; G06T 15/04; G06T 17/20
See application file for complete search history.

(56) References Cited

U.S. PATENT DOCUMENTS

| | | |
|---|---|---|
| 2013/0106867 A1 | 5/2013 | Joo et al. |
| 2017/0256257 A1 | 9/2017 | Froelich |
| 2019/0035149 A1* | 1/2019 | Chen .................... G06V 40/166 |
| 2022/0134225 A1 | 5/2022 | Omote |

OTHER PUBLICATIONS

Ramesh et al., "Zero-Shot Text-to-Image Generation", arXiv:2102. 12092v2 [cs.CV], Feb. 26, 2021, 20 pages.
Ramesh et al., "Hierarchical Text-Conditional Image Generation with CLIP Latents", arXiv:2204.06125v1 [cs.CV], Apr. 13, 2022, pp. 1-27.

(Continued)

*Primary Examiner* — Matthew Salvucci
(74) *Attorney, Agent, or Firm* — XSENSUS LLP

(57) ABSTRACT

A method for user command-guided editing of an initial textured 3D morphable model of an object comprising: obtaining the initial textured 3D morphable model of the object comprising an initial texture map and an initial 3D mesh model of the object; and determining an edited texture map of the object corresponding to the user command by editing the initial texture map of the object based on a first artificial neural network; and/or determining an edited 3D mesh model of the object corresponding to the user command by editing the initial 3D mesh model of the object based on a second artificial neural network; and generating an edited textured 3D morphable model of the object corresponding to the user command based on the edited texture map of the object and/or the edited 3D mesh model of the object.

16 Claims, 12 Drawing Sheets

(b) Expression Manipulation (a) Texture Manipulation

(56) References Cited

OTHER PUBLICATIONS

Radford et al., "Learning Transferable Visual Models From Natural Language Supervision", Proceedings of the 38th International Conference on Machine Learning, PMLR, vol. 139, 2021, 16 pages.

Radford et al., "Learning Transferable Visual Models From Natural Language Supervision", arXiv:2103.00020v1 [cs.CV], Feb. 26, 2021, pp. 1-48.

Lattas et al., "AvatarMe: Realistically Renderable 3D Facial Reconstruction "in-the-wild"", 2020 IEEE/CVF Conference on Computer Vision and Pattern Recognition (CVPR), 2020, pp. 757-766.

Lattas et al., "AvatarMe++: Facial Shape and BRDF Inference With Photorealistic Rendering-Aware GANs", IEEE Transactions on Pattern Analysis and Machine Intelligence, vol. 44, No. 12, Dec. 2022, pp. 9269-9284.

Tewari et al., "StyleRig: Rigging StyleGAN for 3D Control over Portrait Images", 2020 IEEE/CVF Conference on Computer Vision and Pattern Recognition (CVPR), 2020, pp. 6141-6150.

Tewari et al., "PIE: Portrait Image Embedding for Semantic Control", ACM Trans. Graph., vol. 39, No. 6, Article 223. Publication date: Dec. 2020, pp. 223:1-223:14.

Gecer et al., "Synthesizing Coupled 3D Face Modalities by Trunk-Branch Generative Adversarial Networks", arXiv:1909.02215v3 [cs.CV], Dec. 2, 2020, pp. 1-19.

Gecer et al., "Fast-GANFIT: Generative Adversarial Network for High Fidelity 3D Face Reconstruction", IEEE Transactions on Pattern Analysis and Machine Intelligence, vol. 44, No. 9, Sep. 2022, pp. 4879-4893.

Gecer et al., "GANFIT: Generative Adversarial Network Fitting for High Fidelity 3D Face Reconstruction", Proceedings of the IEEE/CVF Conference on Computer Vision and Pattern Recognition (CVPR), Jun. 2019, pp. 1155-1164.

Canfes et al., "Text and Image Guided 3D Avatar Generation and Manipulation", arXiv:2202.06079v1 [cs.CV], Feb. 12, 2022, pp. 1-12.

Grassal et al., "Neural Head Avatars from Monocular RGB Videos", arXiv:2112.01554v2 [cs.CV], Mar. 28, 2022, pp. 1-18.

Bau et al., "Paint by Word", arXiv:2103.10951v2 [cs.CV], Mar. 24, 2021, 10 pages.

Laine et al., "Modular Primitives for High-Performance Differentiable Rendering", arXiv:2011.03277v1 [cs.GR], Nov. 6, 2020, p. 194:1-194:14.

Hong et al., "AvatarCLIP: Zero-Shot Text-Driven Generation and Animation of 3D Avatars", arXiv:2205.08535v1 [cs.CV], ACM Trans. Graph., vol. 41, No. 4, Article 161. Publication date: Jul. 2022, pp. 161:1-161:19.

Pavlakos et al., "Expressive Body Capture: 3D Hands, Face, and Body from a Single Image", Computer Vision and Pattern Recognition (CVPR) 2019, pp. 1-4.

Romero et al., "Embodied Hands: Modeling and Capturing Hands and Bodies Together", SIGGRAPH Asia 2017, Available Online at: https://mano.is.tue.mpg.de, pp. 1-5.

Osman et al., "SUPR: A Sparse Unified Part-Based Human Representation", Available Online At: https://github.com/ahmedosman/SUPR, ECCV 2022, pp. 1-18.

Aleksa Gordić, "OpenAI Whisper: Robust Speech Recognition via Large-Scale Weak Supervision | Paper and Code", Available Online at: https://www.youtube.com/watch?v=AwJf8aQfChE, 2022, pp. 1-3.

"Introducing Whisper", Available Online at: https://openai.com/blog/whisper/, Sep. 21, 2022, pp. 1-6.

Luo et al., "Normalized Avatar Synthesis Using StyleGAN and Perceptual Refinement", In Proceedings of the IEEE/CVF Conference on Computer Vision and Pattern Recognition (CVPR), Jun. 2021, pp. 11657-11667.

Crowson et al., "VQGAN-CLIP: Open Domain Image Generation and Editing with Natural Language Guidance", 2021, pp. 1-17.

Youwang et al., "CLIP-Actor: Text-Driven Recommendation and Stylization for Animating Human Meshes", In ECCV, 2022, pp. 1-18.

Kowalski et al., "CONFIG: Controllable Neural Face Image Generation" In European Conference on Computer Vision (ECCV), 2020, pp. 1-17.

Petrovich et al., "TEMOS: Generating diverse human motions from textual descriptions", In European Conference on Computer Vision (ECCV), 2022, pp. 1-18.

Loper et al., "SMPL: A Skinned Multi-Person Linear Model". ACM Trans. Graphics (Proc. SIGGRAPH Asia), vol. 34, No. 6, Oct. 2015, pp. 248:1-248:16.

Michel et al., "Text2Mesh: Text-Driven Neural Stylization for Meshes" 2022 IEEE/CVF Conference on Computer Vision and Pattern Recognition (CVPR), IEEE, Jun. 18, 2022, pp. 13482-13492.

Lee et al., "StyleUV: Diverse and High-quality UV Map Generative Model", arXiv:2011.12893v1 [cs.GR], Nov. 25, 2020, pp. 1-12.

Khalid et al., "CLIP-Mesh: Generating textured meshes from text using pretrained image-text models", 22 Conference Papers, Dec. 6-9, 2022, 8 pages.

Ruiz et al., "DreamBooth: Fine Tuning Text-to-Image Diffusion Models for Subject-Driven Generation", arXiv:2208.12242v1 [cs.CV], Aug. 25, 2022, pp. 1-21.

Nikolay Jetchev, "ClipMatrix: Text-controlled Creation of 3D Textured Meshes", arXiv:2109.12922v1 [cs.LG], Sep. 27, 2021, pp. 1-4.

Chakladar et al., "3D Avatar Approach for Continuous Sign Movement Using Speech/Text", Applied Science, vol. 11, No. 3439, Available Online at: https://doi.org/10.339011083439, Apr. 12, 2021, pp. 1-13.

Avrahami et al., "Blended Diffusion for Text-driven Editing of Natural Images", In Proceedings of the IEEE/CVF Conference on Computer Vision and Pattern Recognition, 2022, pp. 18187-18197.

Patashnik et al., "StyleCLIP: Text-Driven Manipulation of StyleGAN Imagery". In Proceedings of the IEEE/CVF International Conference on Computer Vision (ICCV), Oct. 2021, pp. 2065-2074.

Michel et al., "Text2Mesh: Text-Driven Neural Stylization for Meshes" 2022 IEEE/CVF Conference on Computer Vision and Pattern Recognition (CVPR), 2022, pp. 13482-13492.

Ghosh et al., "GIF: Generative Interpretable Faces", In International Conference on 3D Vision (3DV), 2020., pp. 868-878.

Abdal et al., "CLIP2StyleGAN: Unsupervised Extraction of StyleGAN Edit Directions", SIGGRAPH '22 Conference Proceedings, Aug. 7-11, 2022, 9 pages.

Abdal et al., "StyleFlow: Attribute-conditioned Exploration of StyleGAN-Generated Images using Conditional Continuous Normalizing Flows", ACM Transactions on Graphics, vol. 40, No. 3, Article 21. Publication date: Apr. 2021, pp. 21:1-21:21.

Marriott et al., "A 3D Gan for Improved Large-pose Facial Recognition", 2021 IEEE/CVF Conference on Computer Vision and Pattern Recognition (CVPR), 2021, pp. 13440-13450.

Gal et al., "StyleGAN-NADA: CLIP-Guided Domain Adaptation of Image Generators", arXiv:2108.00946v2 [cs.CV], Dec. 16, 2021, pp. 1-25.

Rombach et al., "High-Resolution Image Synthesis with Latent Diffusion Models", arXiv:2112.10752v2 [cs.CV], Apr. 13, 2022, pp. 1-45.

Slossberg et al., "Unsupervised High-Fidelity Facial Texture Generation and Reconstruction", arXiv:2110.04760v1 [cs.CV], Oct. 10, 2021, pp. 1-13.

Laine et al., "Modular Primitives for High-Performance Differentiable Rendering", ACM Transactions on Graphics, vol. 39, No. 6, Dec. 2020, pp. 194:1-194:14.

Aneja et al., "ClipFace: Text-guided Editing of Textured 3D Morphable Models", arXiv:2212.01406v1, Dec. 2, 2022, pp. 1-16.

Karras et al., "Training Generative Adversarial Networks with Limited Data", 34th Conference on Neural Information Processing Systems (NeurIPS 2020), pp. 1-11.

Karras et al., "A Style-Based Generator Architecture for Generative Adversarial Networks", In 2019 IEEE/CVF Conference on Computer Vision and Pattern Recognition (CVPR), 2019, pp. 4396-4405.

Karras et al., "Analyzing and Improving the Image Quality of StyleGAN", 2020 IEEE/CVF Conference on Computer Vision and Pattern Recognition (CVPR), 2020, pp. 8107-8116.

(56)     References Cited

OTHER PUBLICATIONS

Karras et al., "Progressive Growing of GANs for Improved Quality, Stability, and Variation", arXiv: 1710.10196v3 [cs.NE], Feb. 26, 2018, pp. 1-26.

Li et al., "Learning a model of facial shape and expression from 4D scans", ACM Transactions on Graphics, vol. 36, No. 6, Article 194. Publication date: Nov. 2017, pp. 194:1-194:17.

Kocasari et al., "StyleMC: Multi-Channel Based Fast Text-Guided Image Generation and Manipulation". In Proceedings of the IEEE/CVF Winter Conference on Applications of Computer Vision (WACV), Jan. 2022, pp. 895-904.

Blanz et al., "A Morphable Model for the Synthesis of 3D Faces", In Proceedings of the 26th Annual Conference on Computer Graphics and Interactive Techniques, SIGGRAPH '99, pp. 187-194.

Feng et al., "Learning an Animatable Detailed 3D Face Model from In-the-Wild Images", ACM Trans. Graph., vol. 40, No. 4, Article 88. Publication date: Aug. 2021, pp. 88:1-88:13.

Deng et al., "Disentangled and Controllable Face Image Generation via 3D Imitative-Contrastive Learning" 2020 IEEE/CVF Conference on Computer Vision and Pattern Recognition (CVPR), 2020, pp. 5153-5162.

Liu et al., "3D-FM GAN: Towards 3D-Controllable Face Manipulation", arXiv:2208.11257v1 [cs.CV], Aug. 24, 2022, pp. 1-26.

* cited by examiner

METHOD, ELECTRONIC DEVICE AND COMPUTER PROGRAM

CROSS-REFERENCE TO RELATED APPLICATION

This application is based upon and claims the benefit of priority of the prior European Patent Application No. 22211197.3, filed on Dec. 2, 2022, the entire contents of which are incorporated herein by reference.

TECHNICAL FIELD

The present disclosure generally pertains to the technical field of 3D image model generation, in particular to devices, methods and programs for a user command-guided editing of an initial textured 3D morphable model of an object.

TECHNICAL BACKGROUND

Modeling 3D content is central to many applications in our modern digital age, including asset creation for video games and films, as well as mixed reality and the like. In particular, modeling 3D human face avatars or full body avatars is an important element towards digital expression.

Often for 3D modeling, 3D mesh models are used for many different applications, as they often rely on the classical graphics pipeline with existing editing and animation frameworks which may guarantee a high interface compatibility. Also, neural implicit 3D representations for digital humans and scenes are used for 3D modeling. Further, 3D morphable models may be used as an approach for modeling animatable avatars, for example with popular blendshape models used for human faces or bodies, which may offer a compact, parametric representation to model an object, while maintaining a mesh representation that fits standard graphics pipelines for editing and animation.

Many content creation processes require extensive time from highly-skilled artists in creating compelling 3D object models (for example of face models or human bodies or other objects), especially if a creator might have a precise idea about how a 3D object, for example a 3D avatar or an animated sequence should look like.

Therefore, it is generally desirable to improve a user commanded generation of 3D objects.

SUMMARY

According to a first aspect, the disclosure provides a method for user command-guided editing of an initial textured 3D morphable model of an object comprising: obtaining the initial textured 3D morphable model of the object comprising an initial texture map and an initial 3D mesh model of the object; and determining an edited texture map of the object corresponding to the user command by editing the initial texture map of the object based on a first artificial neural network; and/or determining an edited 3D mesh model of the object corresponding to the user command by editing the initial 3D mesh model of the object based on a second artificial neural network; and generating an edited textured 3D morphable model of the object corresponding to the user command based on the edited texture map of the object and/or the edited 3D mesh model of the object.

According to a second aspect, the disclosure provides an electronic device comprising circuitry configured to perform a user command-guided editing of an initial textured 3D morphable model of an object comprising: obtaining the initial textured 3D morphable model of the object comprising an initial texture map and an initial 3D mesh model of the object; and determining an edited texture map of the object corresponding to the user command by editing the initial texture map of the object based on a first artificial neural network; and/or determining an edited 3D mesh model of the object corresponding to the user command by editing the initial 3D mesh model of the object based on a second artificial neural network; and generating an edited textured 3D morphable model of the object corresponding to the user command based on the edited texture map of the object and/or the edited 3D mesh model of the object.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
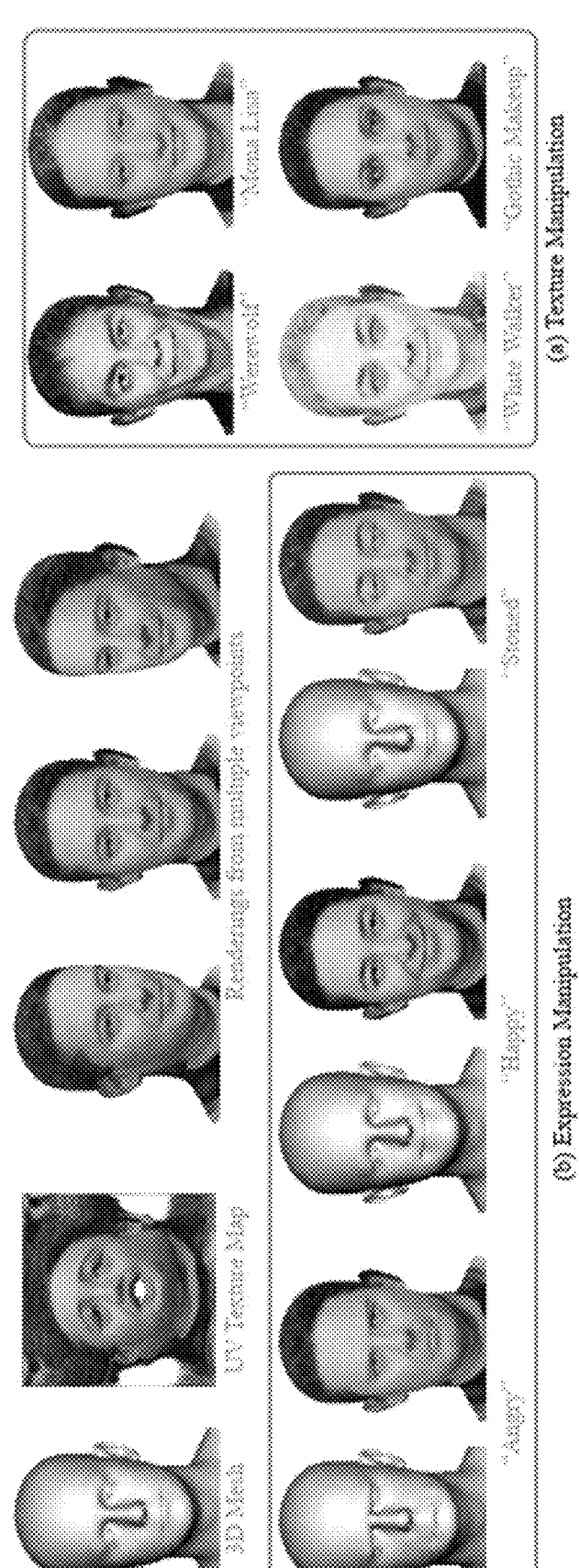
FIG. 1 shows a given 3D mesh with fixed topology, and an arbitrary generated face textures as texture maps, and renderings from multiple viewpoints which are based thereon (top row on the left)

The embodiments described below in more detail disclose a method for user command-guided editing of an initial textured 3D morphable model of an object comprising: obtaining the initial textured 3D morphable model of the object comprising an initial texture map and an initial 3D mesh model of the object; and determining an edited texture map of the object corresponding to the user command by editing the initial texture map of the object based on a first artificial neural network; and/or determining an edited 3D mesh model of the object corresponding to the user command by editing the initial 3D mesh model of the object based on a second artificial neural network; and generating an edited textured 3D morphable model of the object corresponding to the user command based on the edited texture map of the object and/or the edited 3D mesh model of the object.

A user command may be a text input (text prompt) for example through a keyboard or the like.

Further, the user command may be a speech of a user in human language like English, German, Chinese or the like.

The speech input may be transcribed into a corresponding text (prompt) based on a speech recognition and transcription method for example like described in the scientific paper "Robust speech recognition via large-scale weak supervision.", by Radford, Alec, et al., OpenAI Blog (2022), or the like.

The user command may comprise attributes describing the object. For example, if the object is a human being the user command may comprise attributes like "young/old", ethnicity ("European", "African", etc.) facial expression ("sad", "surprised", "happy" etc.), or other attributes referring to cultural references like "zombie" or "gothic makeup". Further specific personalities as long as there are celebrities can be generated.

In another embodiment the command may be input by a computer instead of a user, for example generated by a neural network. In yet another embodiment instead of a command by a user, the command may be obtained by an image recognition software which is recognizing text in a book or the like.

The user might have a precise idea about how the 3D object (for example an avatar) should look like, and he might be able to precisely describe it using natural everyday human language. However, current 3D object (avatar) generation tools don't provide a possibility of taking natural language descriptions (in the form of speech or text) as input and thus cannot produce results that faithfully reflect the (possibly complex) vision the user has for the desired avatar. The same issue applies if a character in a video game (for example to local markets or to the players' individual wishes) should be adapted, because the generation engines are often only providing ways to express the desired changes in complex attribute descriptions, suited only for highly skilled persons via textual prompt.

The method described herein (also referred to as "Clip-Face") however, may enable the generation of highly customizable 3D objects (for example avatars) in a fast and efficient way. It may generate new identities and it may also be used to build 3D (photorealistic or stylized) avatars that correspond to real images. The avatars may be personalized and animated by a user in an intuitive way, using vocal or text commands in normal human language.

The object may be full human person (comprising head and body) or parts of a human person like the head or the face or an arm or the like. Further, in another embodiment the object may be an animal or a fantasy creature or a mythical creature like an elf, dwarf, sea monster, Wolpertinger or the like.

An artificial neural network may be any artificial neural network architecture. For example, a Convolutional Neural Networks, a Deep Neural Networks (DNN), a Recurrent Neural Networks, a Long short-term memory, a Deep belief network, a Stochastic Neural Networks, an Autoencoder, a Generative Adversarial Network or the like. An artificial neural network may comprise many layers, for example an input layer and an output layer. Each layer may for example comprise multiple (artificial) neurons. Each neuron may have an input and an output.

Further, a system of several artificial neural networks, which may be trained together or separately, may be denoted as an artificial neural network.

A texture (also called texture map) refers to an image that is displayed on the surface of a virtual body. Therefore, in computer graphics, a texture may be used as a "coating" for 3D models of objects to increase their level of detail, but without increasing the level of detail of the geometry. A texture (probably together with a so-called shader) can map material properties and selectively change virtually any property of a surface, for example, the color, surface normal, "roughness" and others. For example, an advantage of using textures over using a more detailed model is that the rendering is often faster, and memory can be saved. Textures make computer-generated images appear more detailed and realistic without the need to refine the underlying model itself.

By texture mapping (also called texture rendering or rendering) the surface of a 3D (surface) model is endowed with the texture (which is a 2D image). In this process, in addition to its position in xyz space, each vertex of a 3D object can also be assigned a texture coordinate in UV space (wherein the texture coordinates are in so called UVcoordinates, and the texture are also called UV-textures) are used to define how a 2D texture is mapped onto the model (which may be defined as a polygon). The textures are defined in more detail in the book "OpenGL Programming Guide" by Mason Woo, Jackie Neider, Tom Davis, OpenGL Architecture Review Board, published by Addison-Wesley Pub (Sd), in 1997, Chapter 9.

A 3D mesh model is a structural build of a 3D model consisting of polygons. A 3D mesh model may use reference points in X, Y and Z axes to define shapes with height, width, and depth. A 3D mesh model may be described by one more input parameter which determined its general appearance (shape, position, expression, pose etc.)

A morphable model may be a model where the points (vertexes) of the model are moveable, may be with regards to specific constrains. For example, the 3D mesh model may be morphed (edited/changed) by editing one or more of input parameters which determine its general appearance (shape, position, expression, pose etc.).

For example, a 3D morphable model of an object may be a generative model for that object, wherein the general appearance of the morphable model that is based on two facts: First, a dense point-to-point correspondence between two objects of the same category (for example two faces or bodies), wherein due to this correspondence, linear combinations of objects of the same category may be defined in a meaningful way, producing morphologically realistic objects of the same category (morphs). Secondly, the morphable model may be based on the idea to separate object shape and color and to disentangle these from external factors such as illumination and camera parameters. This is described with regards to faces for example in the scientific paper "3d morphable face models—past, present, and future.", by Egger, Bernhard, et al, ACM Transactions on Graphics (TOG) 39.5 (2020): 1-38.

A 3D morphable model for human faces is described for example in detail in the FLAME model, given in reference [30]. The input parameters of the 3D mesh model based on the FLAME model (see [30]) are: $\vec{\beta}$ the shape parameters, $\vec{\theta}$ are the yaw pose and $\vec{\psi} \in \mathbb{R}^{50}$ the linear expression coefficients.

A 3D morphable model for full body humans is described in detail in the SMPL-X model, described in the scientific paper "Expressive body capture: 3d hands, face, and body from a single image.", by Pavlakos, Georgios, et al, Proceedings of the IEEE/CVF conference on computer vision and pattern recognition. 2019. The input parameters of the 3D mesh model based on the SMPL-X model (see paper cited above) are: $\theta_f$ for the jaw joint, $\theta_h$ for the finger joints, $\theta_b$ for the remaining body joints, $\beta$ for the joint body, face and hands shape parameters and $\psi$ for the facial expression parameters. Each of the input parameters or a combination of the input parameters may be regarded as general appearance parameter of the 3D model.

A 3D morphable model for a human person, may be further edited such that movements of the 3D model are realized. For example, a user command could be "generate 30 fearful avatars with clown make-up run randomly with their arms to their skies".

In yet another embodiment the object may be a hand which may be 3D mesh modeled as described in the scientific paper "Embodied Hands: Modeling and Capturing Hands and Bodies Together", by Javier Romero, Dimitrios Tzionas, Michael J. Black, ACM Transactions on Graphics, Vol. 36, No. 6, Article 245. Publication date: November 2017. This model may also be used if a body including a hand is modeled.

Further, a 3D morphable mesh model for a full human person may be used according to the SPUR model as described in the scientific paper "SUPR: A Sparse Unified Part-Based Human Representation.", by Osman, Ahmed A A, et al., European Conference on Computer Vision. Springer, Cham, 2022.

In another embodiment the above-described models (FLAME, SMPL-X, hand-model, SPUR etc.) may be combined together to obtain a 3D model of an object.

The initial 3D mesh model of the object may be in a neutral position with regards to that object. For example, a neutral position or neutral state with regards to the object may be a position that is most common with regards to the object. The initial 3D mesh model may also be in a state or position from which every possible morphable state of the object is reachable with the least changing the model, that is a kind of average position of the model with regards to the object. For example, if the modeled object is a human person, the initial 3D mesh model of the human person may be in a standing upright position with hanging arms and a neutral face expression. If the object that is modeled is a face of a person, the initial 3D mesh model of the face may be neutral face expression, that would be described as neutral by an average observer.

In another embodiment the initial 3D mesh model of the object may be instead or additionally described by a specific value of the input parameters.

For example, in an initial 3D mesh model based on the SMPL-X model (see paper cited above), all parameters of the model (i.e., $\theta_f$ for the jaw joint, $\theta_h$ for the finger joints, $\theta_b$ for the remaining body joints, $\beta$ for the joint body, face and hands shape parameters and $\psi$ for the facial expression parameters) may be in a neutral state as defined in the paper (neutral gender, neutral hand position, neutral face expression etc.)

Further, if the modeled objects is face which is modeled with the FLAME model, the initial 3D mesh model may be defined by the three model parameters as described in [30] ($\vec{\beta}, \vec{\theta}, \vec{\psi}$) as all being in a neutral position as described in [30].

In another embodiment the initial 3D mesh model of the object may be a randomly chosen position/state of the 3D mesh model An initial texture map of the object may be the most likely texture map for that object, which for example occurs the most often together with the object. Further, an initial texture map of the object may be a neutral texture map of the object, for example determined as an average of all meaningful texture maps for that object. The initial texture map of the object may also be determined such that every other meaningful texture map of that object is reachable with the least change of the texture map, that is a kind of average position of the texture map with regards to the object.

In another embodiment the initial texture map may be determined by the initial 3D mesh model. For example, if the object is a human face, the initial texture map of the human face may have a neutral expression as described above with regards to the initial 3D mesh model. For example, if the object is a human person, the initial texture map of the human person may have a neutral state and appearance as described above with regards to the initial 3D mesh model.

In another embodiment the initial texture map of the object may be a randomly generated texture map for the object, or randomly chosen among a set of available meaningful texture maps for that object.

A texture map (that is a 2D image) may be edited by changing the RGB colors corresponding to each pixel of the texture map.

In one embodiment the editing of an initial texture map (to obtain an edited texture map) may be performed by a first artificial neural network with regards to a user command. The editing may be done by first artificial neural network directly, wherein the initial texture map is input into the first artificial neural network and the edited texture map is received as output wherein the first artificial neural network is trained such that the initial texture map is edited into the edited texture map as described by the user command.

In another embodiment editing may be done by first artificial neural network indirectly, wherein a data derivative (the data derivative is derived through a defined operation from the initial texture map), which characterizes the initial texture map (for example a corresponding initial texture latent code), is input into the first artificial neural network and the edited data derivative of the initial texture map (for example an offset texture latent code) is received as output of the first artificial neural network. Based on the edited data derivative of the initial texture map (for example an offset texture latent code) the edited texture map of the object may be determined (for example by a further (third) artificial neural network, or by applying any other predetermined operation to the edited data derivative of the initial texture map). Further, the first artificial neural network may be trained such that the data derivative of the initial texture map is edited into the edited data derivative of the initial texture map, such that the further determined edited texture map of the object is determined as described by the user command. The training may be done as described in the CLIP (see [38]).

A 3D mesh model may be edited (or morphed) by changing the coordinates of the points (vertexes) of the model. This may be done by editing one or more of the input parameters which determine its general appearance (shape, position, expression, pose etc.). An initial 3D mesh model may be edited into an edited 3D mesh model by changing/editing one or more of the input parameters to the 3D mesh model which determine its general appearance.

In one embodiment the editing of an initial 3D mesh model (to obtain an edited 3D mesh model) may be performed by a second artificial neural network with regards to a user command. The editing may be done by the second artificial neural network directly wherein the initial 3D mesh model is input into the second artificial neural network and the edited 3D mesh model is received as output, wherein the second artificial neural network is trained such that the initial 3D mesh model is edited into the edited 3D mesh model as described by the user command.

In another embodiment editing may be done by a second artificial neural network indirectly, wherein a data derivative (the data derivative is derived through a defined operation from the initial 3D mesh model), which characterizes the initial 3D mesh model (for example an input parameter to the 3D mesh model, or the initial general appearance parameter or an initial texture latent code or an average of the initial texture latent code or the like) is input into the second artificial neural network and the edited data derivative of the initial 3D mesh model (for example an edited input parameter to the 3D mesh model, or the offset general appearance parameter or an offset initial texture latent or the like) is received as output of the second artificial neural network. Based on the edited data derivative of the initial 3D mesh model, the edited 3D mesh model of the object may be determined (for example by a inputting the edited parameter into the 3D mesh model, or by further applying an artificial neural network edited data derivative of the initial 3D mesh model or by applying any other predetermined operation to the edited data derivative of the initial 3D mesh model). Further, the second artificial neural network may be trained such that the data derivative of the initial 3D mesh model is edited into the edited a data derivative of the initial 3D mesh model, such that the further determined edited 3D mesh model of the object is determined as described by the user command. The training may be done as described in the CLIP (see [38]).

In yet another embodiment the initial textured 3D morphable model of the object (comprising an initial texture map of the object and an initial 3D mesh model of the object) is an already edited textured 3D morphable model of the object (comprising an edited texture map of the object and an edited 3D mesh model of the object), which may be was generated by the method described herein through a previous applying of the method. That means in this example, model already generated by the method described herein, is further modified. For example, a human face of a woman that was generated by the method described herein in applying of the method, may be again applying the method to modify the face by adding red lipstick to the lips.

In some embodiments the method further comprises generating the initial texture map of the object and a corresponding initial texture latent code based on a third artificial neural network; and/or generating the initial 3D mesh model of the object based on an initial general appearance parameter.

A latent code corresponding to an object is an element of a latent space corresponding to that object. A latent space (also referred to as latent feature space or embedding space), is a representation of compressed data describing the object, where similar objects (with regards to specific features) are closer together in space (with regards to specific metric). That is the dimensionality of the latent space is (much) lower than the dimensionality of the feature space describing the object. That is making the construction of a latent space an example of dimensionality reduction, which can also be viewed as a form of data compression. Latent spaces are usually fitted via artificial neural networks or other machine learning techniques. Artificial neural networks may learn to generate objects based on latent codes (also called latent representations) of the objects, wherein the dimension of the latent code may be much lower than the dimension of the objects.

The third artificial neural network may be trained to generate the initial texture map of the object based on the corresponding initial texture latent code. The dimension of the initial texture map of the object may be larger than the dimension of the corresponding initial texture latent code. Therefore, the initial texture latent code is a latent code of the initial texture map because it is compressed information.

Further, the edited texture map of the object or the initial texture map of the object may be rendered together with the edited 3D mesh model of the object or the initial 3D mesh model of the object to obtain an output image corresponding to the user command. The rendering may be a differentiable renderer such that the backpropagation may determine differentiable gradients in training phase (reference [26]).

The setup, training, and generation of the third artificial neural network may be as described below in more detail.

A general appearance parameter of the 3D mesh model may be an input parameter to the 3D mesh model that controls the general appearance (shape, position, expression, pose etc.) of the 3D mesh model. The general appearance parameter may be one of the input parameters to the 3D mesh model or a combination of several input parameters to the 3D mesh model.

The 3D mesh model may be morphed/edited by changing only the general appearance parameter and holding the other input parameters of the 3D mesh model constant.

For example, the input parameters of the 3D mesh model based on the SMPL-X model (see paper cited above), all parameters of the model may be $\theta_f$ for the jaw joint, $\theta_h$ for the finger joints, $\theta_b$ for the remaining body joints, $\beta$ for the joint body, face and hands shape parameters and $\psi$ for the facial expression parameters. Each of the input parameters or a combination of the parameters may be regarded as the general appearance parameter.

For example, if the input parameters of the 3D mesh model based on the FLAME model (see [30]) are $\vec{\beta}$ the shape parameters, $\vec{\theta}$ are the yaw pose and $\vec{\psi} \in \mathbb{R}^{50}$ the linear expression coefficients. Each of these input parameters or a combination of the parameters may be regarded as the general appearance parameter.

The initial general appearance parameter may be set to a value as described above with regards to the initial 3D mesh model.

In some embodiments the method further comprises determining an offset texture latent code based on the initial texture latent code by the first artificial neural network corresponding to the user command and determining the edited texture map of the object by the second artificial neural network based on the offset texture latent code; and/or determining an offset shape parameter based on the initial texture latent code by the second artificial neural network corresponding to the user command and determining the edited 3D mesh model of the object based on the offset expression parameter.

An offset latent code may be a difference between two latent codes in the latent space. A first latent code corresponding to a first object and a second latent code corresponding to a second object may be learned by an artificial neural network as described above. The difference between the two latent codes may be denoted as offset latent code.

An offset texture latent code may be a difference between two texture latent codes in the latent space. A first texture latent code corresponding to a texture map and a second texture latent code corresponding to a second texture map may be learned by an artificial neural network as described above. The difference between the two texture latent codes may be denoted as offset texture latent code.

An offset texture latent code is determined by the first artificial neural network corresponding to the user command. The first artificial neural network may receive the initial texture latent code as an input and may output the offset texture latent code. Based on the determined offset texture latent code an edited texture map of the object may be determined by the third artificial neural network.

The first artificial neural network may receive the offset texture latent code as input and outputs the edited texture map of the object. In another embodiment the first artificial neural network may receive a sum of the offset texture latent code and the initial texture latent code as input and outputs the edited texture map of the object. In yet another embodiment the first artificial neural network may receive the offset texture latent code and any further predetermined parameter as input and outputs the edited texture map of the object.

The general appearance parameter may be one of the input parameters to the 3D mesh model or a combination of several input parameters to the 3D mesh model or all input parameters to the 3D mesh model.

An offset general appearance parameter may be a difference between two general appearance parameter which correspond to a 3D mesh model. A first general appearance parameter may yield a first appearance of the 3D mesh model and a second general appearance parameter may yield a second appearance of the 3D mesh model. The difference between two appearances of a 3D mesh models may be described by an offset general appearance parameter.

A general appearance parameter may be determined by the second artificial neural network corresponding to the user command. The second artificial neural network may receive an input which is based on the initial texture latent code and output the offset general appearance parameter. In one embodiment the second artificial neural network may receive the initial texture latent code as an input and outputs the offset general appearance parameter. In yet another embodiment the second artificial neural network may receive an average value (of each row) of the initial texture latent code as an input and outputs the offset general appearance parameter. In yet another embodiment the second artificial neural network may receive an several different predefined inputs and outputs the offset general appearance parameter Based on the determined offset general appearance parameter an edited 3D mesh model of the object may be determined by replacing the general appearance parameter in the initial 3D mesh model with the generated offset general appearance parameter. In another embodiment the general appearance parameter in the initial 3D mesh model is replaced with a sum of the initial general appearance parameter and the offset general appearance parameter. In yet another embodiment the initial general appearance parameter in the initial 3D mesh model is replaced with the offset general appearance parameter and a further predetermined parameter.

In some embodiments the object may be a human face and the initial 3D mesh model may be a FLAME model and the initial general appearance parameter (also the offset appearance parameter) of the 3D mesh model may be the linear expression coefficients of the FLAME model. For example, the linear expression coefficients in FLAME ($\vec{\psi} \in \mathbb{R}^{50}$ the linear expression coefficients) may be edited through the process described above and the other parameters of the FLAME model ($\vec{\beta}$ the shape parameters, $\vec{\theta}$ are the yaw pose) may be held constant through the prediction of the linear expression coefficients $\vec{\psi} \in \mathbb{R}^{50}$. For example, the other parameters of the FLAME model ($\vec{\beta}$ the shape parameters, $\vec{\theta}$ are the yaw pose) may be set to a neutral value as described in the FLAME model paper.

In some embodiments the object may be a human person or parts thereof, and the initial 3D mesh model may a SMPL-X model and the initial general appearance parameter (also the offset general appearance parameter) of the 3D mesh model may be any of the following parameters or a combination thereof: a jaw joint parameter, finger joints parameter, remaining body joints parameter, combined body, face, hands shape parameters and/or facial expression parameters as described in the SMPL-X paper cited above. The parameters that are not chosen as the general appearance parameter may be held at a constant value (may be neutral) throughout the process of determining the general appearance parameter.

In yet another embodiment the object may be a hand, which may be modeled as described in the scientific paper "Embodied Hands: Modeling and Capturing Hands and Bodies Together", by Javier Romero, Dimitrios Tzionas, Michael J. Black, ACM Transactions on Graphics, Vol. 36, No. 6, Article 245. Publication date: November 2017. This model may also be used if a body including a hand is modeled.

Further, a 3D morphable mesh model for a full human person may be used according to the SPUR model as described in the scientific paper "SUPR: A Sparse Unified Part-Based Human Representation.", by Osman, Ahmed A A, et al., European Conference on Computer Vision. Springer, Cham, 2022.

In another embodiment the above-described models (FLAME, SMPL-X, hand-model, SPUR) may be combined together to obtain a 3D model of an object and general appearance parameter may be chosen as a combination of parameters from the above-cited models.

In some embodiment the first artificial neural network and/or the second artificial neural network may be trained based on one or more texture maps and corresponding texture latent codes, wherein the texture maps and corresponding texture latent codes are generated based on a third artificial neural network (G, M).

The third artificial neural network (G, M) which may generate the texture maps on which the first artificial neural network and/or the second artificial neural network are trained on, may be the same artificial neural network which generated the initial texture map of the object and the corresponding initial texture latent code. Further, the third artificial neural network (or parts thereof), which may generate the texture maps on which the first artificial neural network and/or the second artificial neural network are trained on, may be the same artificial neural network which determines the edited texture map of the object based on the offset texture latent code. This artificial neural network (or parts thereof) may be referred to as third artificial neural network (an embodiment of a training of this third artificial neural network is described in more detail below).

In another embodiment the above-described three artificial neural networks may be different or two of them may be the same.

In some embodiments the third artificial neural network is trained by an adversarial self-supervised training.

A system of artificial neural networks, for example generative adversarial network (GAN), may comprise the third artificial neural network. A GAN may consist of two or more neural networks—a generator that generates the desired output (for example a texture map) and a discriminator that classifies an input as real or fake (i.e., generated). A GAN may generate a texture map (UV map) which can be wrapped around a 3D mesh model to generate the textured 3D model. For example, the third artificial neural network may be a generator network (or a part thereof) of a GAN. GANs are well known to the person skilled in the art and are for example described in more detail in reference [20], which describes a StyleGAN which may be used to train a generator which may be used as third artificial neural network. Therefore, an artificial neural network that is trained within a generator-discriminator setup (like GAN) may be referred to as being trained in an adversarial training.

Further, two or more discriminators may be used to optimize the training and the generation results. For example, one or more patch discriminators may be used which may not discriminate a complete texture map against each other but parts of texture maps.

The system of artificial neural networks, for example a GAN, may receive as an input during the training phase texture maps/and or RGB images or other inputs like a randomly generated texture latent code, and learns to generate artificial texture maps and corresponding laten texture codes.

Further, the third artificial neural network may be trained in a self-supervised fashion, which means that the input data (for example RGB images) may not be labeled manually but instead the generated outputs may be fed to the discriminator(s) in order to determine a loss function which may be used to adapt the weights of the third artificial neural network.

In some embodiments third artificial neural network may be trained based on a plurality of RGB images.

In one embodiment the system of artificial neural networks, for example a GAN, may receive as an input during training phase texture maps and generate artificial texture maps and corresponding laten texture codes. However, may be there are no large datasets of texture maps available. Texture maps of objects, for example faces, may have a different look and geometry than normally recorded or rendered 2D RGB images of an object. Therefore, the third artificial neural network or the system of artificial neural networks comprising the third artificial neural network may be trained by using normally recorded (non-texture map) 2D RGB images (and may also using randomly generated texture latent code).

In one embodiment the 2D RGB images are used to extract a general appearance parameter with regards to a 3D mesh model. Then starting from a randomly generated texture latent code, a generator network (the third artificial network) may be trained to generate a texture map based on the generated texture latent code which is then (differentially) rendered together with the 3D mesh model. Thereby, the general appearance parameters defining the 3D mesh model may be sampled from a distribution which is built based on the general appearance parameters extracted from the input 2D RGB images. The extracting of the general appearance parameters may be performed as described in DECA (which is described in more detail for example in [10]).

In some embodiments the first artificial neural network and/or the second artificial neural network may be trained with regards to a loss function which is based on a pre-trained vision-language model supervision and the user command.

A loss function in the field of training artificial neural networks, may quantify the difference between the expected outcome of the network and the outcome produced by the network. From the loss function, an adaption direction for the network weights may be derived, by so called backpropagation.

In machine learning, so called backpropagation is a widely used algorithm for training (feedforward) artificial neural networks (backpropagation is also used very generally to a class of algorithms and functions that are used for network training). When fitting (the weights of) an artificial neural network, backpropagation computes a gradient of the loss function with respect to the weights of the network, for a single input-output example, and does so efficiently, unlike a naive direct computation of the gradient with respect to each weight individually. This efficiency makes it feasible to use gradient methods for training multilayer networks, updating weights to minimize the loss function. For example, so called gradient descent, or variants thereof such as stochastic gradient descent, are commonly used (differentiable rendering (see [26]) as described below may be used in this application for rendering textures and meshes in order to obtained differentiable functions to determined gradients for backpropagation). The backpropagation algorithm may work by computing the gradient of the loss function with respect to each weight by the chain rule, computing the gradient one layer at a time, iterating backward from the last layer to avoid redundant calculations of intermediate terms in the chain rule; this is an example of dynamic programming.

Further, the edited texture map of the object or the initial texture map of the object may be rendered together with the edited 3D mesh model of the object or the initial 3D mesh model of the object to obtain an output image. The rendering may be a differentiable renderer such that the backpropagation may determine differentiable gradients (reference [26]).

A (pre-trained) vision-language model can assess visual context in an image and generate descriptive text based on that. Different vision-language models are described in the scientific paper "A survey of vision-language pre-trained models.", Du, Yifan, et al., arXiv preprint arXiv:2202.10936 (2022) and the papers cited therein. For example, a (pre-trained) vision-language model "CLIP", as described in reference [36] and/or [38], may be used.

In some embodiments a difference measure is determined between the user command and a descriptive text, which is generated by the pre-trained vision-language model, of a visual context in a rendered image based on the edited textured 3D morphable model of the object.

The loss function may be based on a difference measure between: 1. A text of the user command, and 2. a generated descriptive text (generated by the (pre-trained) vision-language model) of the visual context of the output image to the first and/or third neural network. The difference measure between the two texts may be based on any metric defined in the corresponding text space, where the texts are compared to each other. For example, the metric may be defined as described in the references [36] and/mor [38] (see the terms $E_T$ and $E_I$ described below which refer to clip encoder for text and image respectively).

The user command (either input as text prompt or a speech transcribed to text by as described above) is influencing the training of the first and second artificial neural networks by being input into the vision-language model which may be used to determine the loss function which subsequently determines the fitting of the weights of the first and second artificial neural networks during backpropagation and minimizing of the loss function.

The loss function may be based on a further input, which may regularize or speed-up the fitting of the network weights.

The first artificial neural network and the second artificial neural network may be trained in a self-supervised fashion. That means the inputs (initial texture map and 3D meshes and user command) may be not labeled manually. The descriptive text of the generated output image is generated by the vision-language model and therefore, the networks may be trained without further human supervision.

Therefore, the first artificial neural network and the second artificial neural network may be trained in a self-supervised fashion based on a differentiable rendering and losses based on a pre-trained CLIP model.

In some embodiments the first artificial neural network and/or the second artificial neural network may be trained based on a plurality of different user commands.

In one embodiment the first artificial neural network and/or the second artificial neural network are trained separately with regards to each user command.

In another embodiment the first artificial neural network and/or the second artificial neural network are trained jointly with regards to a plurality of user commands. This may be described in more detail for example in the scientific paper "High-resolution image synthesis with latent diffusion models.", by Rombach, Robin, et al., in Proceedings of the IEEE/CVF Conference on Computer Vision and Pattern Recognition. 2022.

In one embodiment during training phase of the first artificial neural network and/or the second artificial neural always the same 3D mesh model is used as initial 3D mesh model for each training iteration but always a different texture map. In another embodiment during training phase of the first artificial neural network and/or the second artificial neural always a different 3D mesh model is used as initial 3D mesh model for each training iteration and always a different texture map. In yet another embodiment during training phase always a different 3D mesh model is used as initial 3D mesh model for each training iteration and always a different texture map.

First and second artificial neural network may be trained with several different texture maps/and or 3D mesh models, for example 50000 or more or less.

In some embodiments the edited texture map of the object or the initial texture map of the object together with the edited 3D mesh model of the object or the initial 3D mesh model of the object are rendered to obtain an image corresponding to the user command.

In some embodiments the method further comprises transcribing the user command, which is a speech input in huma language, into a text.

Further, the user command may be a speech of a user in human language like English, German, Chinese or the like. The speech input may be transcribed into a corresponding text (prompt) based on a speech recognition and transcription method for example like described in the scientific paper "Robust speech recognition via large-scale weak supervision.", by Radford, Alec, et al., OpenAI Blog (2022), or the like.

The user command may comprise attributes describing the object. For example, if the object is a human the user command may comprise attributes like "young/old", ethnicity ("European", "African", etc.) facial expression ("sad", "surprised", "happy" etc.), or other attributes like other attributes referring to cultural references like "zombie" or "gothic makeup". Further specific personalities as long as there are celebrities can be generated.

In one embodiment a game designer for example may speak into a microphone while designing a game. Speech recognition software transcribes the speech into a text prompt. And the text prompt is provided to the game design algorithm which is based on a neural network.

In some embodiments the method may further comprise obtaining a plurality of different initial 3D mesh models of the object; and determining a plurality of edited texture maps of the object corresponding to the plurality of the initial 3D mesh models of the object and to the user command by jointly editing the initial texture map of the object a plurality of times based on and the plurality of initial 3D mesh models; and generating a plurality of edited textured 3D morphable models of the object corresponding to the user command based on the plurality of edited texture maps of the object and on the plurality of initial 3D mesh models of the object; and rendering the plurality of edited texture maps of the object together with the plurality of initial 3D mesh models of the object to obtain a plurality of images corresponding to the user command.

In one embodiment the plurality of initial 3D mesh models of an object are obtained from movie or a film or a video sequence or the like.

The first artificial neural network may for each iteration receive a plurality of inputs corresponding to the plurality of initial 3D mesh models. In one embodiment each of the plurality of inputs may comprise the same initial texture latent code (as described above) and a further general appearance parameter corresponding to one of the pluralities of initial 3D mesh models which is extracted from the each plurality of initial 3D mesh models as described above and below.

In another embodiment each of the plurality of inputs may comprise a different initial texture latent code and a further general appearance parameter corresponding to one of the plurality of initial 3D mesh models, which is extracted from the each plurality of initial 3D mesh models as described above and below.

The first artificial neural network may then determine a plurality of texture maps, which are rendered together with the given plurality of initial 3D mesh models to obtain a plurality of rendered images corresponding to the user command.

During training the rendered output image of the first artificial neural network may be used to construct a loss function, which may be similar as described above, for example using pre-trained vision-language model base on which a difference between the user command and the generated descriptive text of the rendered output image is determined. The loss function, based on the user command, may then fit the weights of the first artificial neural network such that it generates the desired video sequence corresponding to the user command.

Other aspects may be similar to the method described above.

The embodiments described below in more detail disclose further an electronic device comprising circuitry which may configured to perform an user command-guided editing of an initial textured 3D morphable model by carrying out the steps: obtaining the initial textured 3D morphable model of the object comprising an initial texture map and an initial 3D mesh model of the object; and determining an edited texture map of the object corresponding to the user command by editing the initial texture map of the object based on a first artificial neural network; and/or determining an edited 3D mesh model of the object corresponding to the user command by editing the initial 3D mesh model of the object based on a second artificial neural network; and generating an edited textured 3D morphable model of the object corresponding to the user command based on the edited texture map of the object and/or the edited 3D mesh model of the object.

Circuitry may include a processor (CPU, GPU etc), a memory (RAM, ROM or the like), a data storage, input means (control buttons, keys), etc. as it is generally known for electronic devices (computers, smartphones, etc.). Moreover, it may include sensors for sensing still image or video image data (image sensor, camera sensor, video sensor, etc.), for sensing a fingerprint, for sensing environmental parameters (e.g. radar, humidity, light, temperature), etc.

The embodiments described below in more detail disclose further a computer program comprising instructions which, when the program is executed by a computer, cause the computer to carry out the steps of the method described above.

I. FIRST EMBODIMENT

1. Introduction

We describe a novel self-supervised approach for text-guided editing of textured 3D morphable model of objects (for example faces). Specifically, we employ user-friendly language prompts to enable control the expressions as well as appearance of 3D faces. In the absence of high-quality texture models for 3D faces, we propose a self-supervised generative model to synthesize photo-realistic facial textures on a 3D morphable model, guided by collections of RGB images. This texture model captures a wide range of facial appearances with fine grain details like wrinkles and facial hair. Leveraging this texture generator, along with the shape and expression space of the 3D morphable model, we show that we can edit textured 3D face models based on text prompt inputs only.

To this end, we propose a neural network that predicts both texture latent codes as well as the expression codes of the morphable model. We train our model in a self-supervised fashion by exploiting differentiable rendering and losses based on a pre-trained CLIP model. Once trained, our model jointly predicts face textures in UV-space, along with expression and pose parameters to capture both geometry and texture changes in face expressions with a single forward pass. We further show the applicability of our method to generate temporally changing textures for a given animation sequence.

Modeling 3D content is central to many applications in our modern digital age, including asset creation for video games and films, as well as mixed reality. In particular, modeling 3D human face avatars is a fundamental element towards digital expression. However, current content creation processes require extensive time from highly-skilled artists in creating compelling 3D face models. Despite the recent attention towards neural implicit 3D representations for digital humans and scenes, 3D meshes remain the gold standard for myriad applications, as they often rely on the classical graphics pipeline with existing editing and animation frameworks.

3D morphable models present a promising approach for modeling animatable avatars, with popular blendshape models used for human faces (e.g., see FLAME in [30]) or bodies (e.g., see SMPL in [32]). In particular, they offer a compact, parametric representation to model an object, while maintaining a mesh representation that fits the classical graphics pipelines for editing and animation. Additionally, the shared topology of the representation enables deformation and texture transfer capabilities.

Despite such morphable models' expressive capability in geometric modeling and potential practical applicability towards artist creation pipelines, they remain insufficient for augmenting artist workflows. This is due to limited controllability, as they rely on PCA models, and lack of texture expressiveness, since the models have been built from very limited quantities of 3D-captured textures; both of these aspects are crucial for content creation and visual consumption. We thus address the challenging task of creating a generative model to enable synthesis of expressive, textured, and articulated human faces in 3D.

We propose a method, to enable controllable generation and editing of 3D faces. We leverage the geometric expressiveness of 3D morphable models and introduce a self-supervised generative model to jointly synthesize textures and adapt expression parameters of the morphable model. To facilitate controllable editing and manipulation, we exploit the power of vision-language models (see also [38]) to enable user-friendly generation of diverse textures and expressions in 3D faces. This allows us to specify facial expressions as well as the appearance of the human via text while maintaining a clean 3D mesh representation that can be consumed by standard graphics applications. Such text-based editing enables intuitive control over the content creation process.

Our generative model is trained in a self-supervised fashion, leveraging the availability of large-scale high-quality face image datasets with differentiable rendering to produce a powerful texture generator that can be controlled along with the morphable model geometry by text prompts. Based on our high-quality texture generator, we learn a neural network that can edit the texture latent code as well as the expression parameters of the 3D morphable model with text prompt supervision and losses based on CLIP. Our approach further enables generating temporally varying textures for a given driving expression sequence.

To summarize, the main aspects (for purposes of understanding without limiting effect) of invention are: We propose a novel approach to controllable editing of textured, parametric 3D morphable models through user-friendly text prompts, by exploiting CLIP-based supervision to jointly synthesize texture and expressions of a 3D face model. Further, our controllable 3D face model is supported by our high-quality texture generator, trained in a self-supervised fashion on 2D images only. Further, our approach additionally enables generating temporally varying textures of an animated 3D face model from a driving video sequence.

2. Related Work

With Regards to Texture Generation: There is a large corpus of research works in the field of generative models for UV textures as for example shown in [12-14, 27-29, 33, 34, 42]. These methods achieve impressive results; however, the majority is fully supervised in nature, requiring ground truth textures, which in turn necessitate collection in a controlled capture setting. Learning self-supervised texture generation is much more challenging, and only a handful of methods exist. For instance, Marriott (see [34]) were among the first to leverage Progressive GANs (see [19]) and 3D Morphable Models (see [5]) to generate textures for facial recognition; however, the textures generated are still relatively low resolution and are unable to produce high-frequency details. Textures generated by Slossberg (see

[42]) made a significant improvement in quality by using pretrained StyleGAN (see [22]) and StyleRig (see [43]). The closest inspiration to our texture generator is StyleUV (see [29]) which also operates on a mesh. Both methods achieve stunning results but currently do not take the head and ears into account. In our work, we propose a generative model to synthesize UV textures for the full-head topology; however, our main focus lies in enabling text-guided editing and control.

With Regards to Semantic Manipulation of Facial Attributes: Manipulation of face images has also seen significant study following the success of StyleGAN2 (see [22]) image generation. In particular, its disentangled latent space facilitates both texture editing as well as enables a level of control over pose and expressions of generated images. Several methods like shown in [2, 9, 15, 25, 31, 43, 44] have made significant progress to induce controllability to images by embedding 3D priors via conditioning the StyleGAN on known facial attributes extracted from synthetic face renderings. However, these methods operate in the 2D image domain, and although they achieve high-quality results on a per-frame basis, consistent and coherent rendering from varying poses and expressions remains challenging. Motivated by such impressive 2D generators, we propose to lift them to 3D and directly operate in UV space of a 3D mesh, thus producing temporally-consistent results when rendering animation sequences.

With Regards to Guided Image Manipulation: The recent progress in 2D language models has opened up significant opportunities for text-guided image manipulation (see [1, 3, 4, 7, 8, 39-41]). For instance, the contrastive language-image pre-training (CLIP, see [38]) model has been used for text-guided editing for a variety of applications (see [6, 11, 17, 24, 35-37, 45]). StyleClip as shown in [36] presented seminal advances in stylizing human face images by leveraging the expressive power of CLIP in combination with the generative power of StyleGAN to produce unique manipulations for faces. This was followed by StyleGAN-Nada as shown in [11], which enables adapting image generation to a remarkable diversity of styles from various domains, without requiring image examples from those domains. However, these manipulations are designed for the image space, and are not 3D consistent.

With Regards to Text-Guided 3D Manipulation: Following the success of text-guided image manipulation, recent works have adopted powerful vision-language models to enable text guidance for 3D object manipulation. Text2Mesh as shown in [35] was one of the first pioneering methods to leverage a pre-trained 2D CLIP model as guidance to generate language-conditioned 3D mesh textures and geometric offsets. Here, edits are realized as part of a test-time optimization that aims to solve for the texture and mesh offsets in a neural field representation, such that their re-renderings minimizes a 2D CLIP loss from different viewpoints. Similar to Text2Mesh, CLIP-Mesh as shown in [23] produces textured meshes by jointly estimating texture and deformation of a template mesh, based on text inputs using CLIP. Recently, Canfes (see [6]) adapt TB-GAN (see [12]), an expression-conditioned generative model to produce UV-texture maps, with a CLIP loss to produce facial expressions in 3D, although the quality of textures and expressions is limited, due to relying on 3D scans for TB-GAN training.

Our method is fundamentally different from this prior art, however. Our focus lies on leveraging the parametric representations of 3D morphable face models with high-fidelity textures, which can enable content creation for direct use in many applications such as games or movies.

3. Method

This self-supervised approach for text-guided editing of textured 3D morphable model of objects (for example faces) targets text-guided synthesis of textured 3D face models. It consists of two fundamental components (illustrated for purposes of understanding without limiting effect):

(i) an expressive generative texture space for facial appearances (see section 3.1 below), and (ii) a text-guided prediction of the latent code of the texture and the expression parameters of the underlying statistical morphable model (see section 3.2 below).

Further, we will detail these contributions and further demonstrate how they enable producing temporally changing expressions for a given animation sequence (see section 3.3. below).

3.1 Generative Synthesis of Face Appearance

Figure 2:
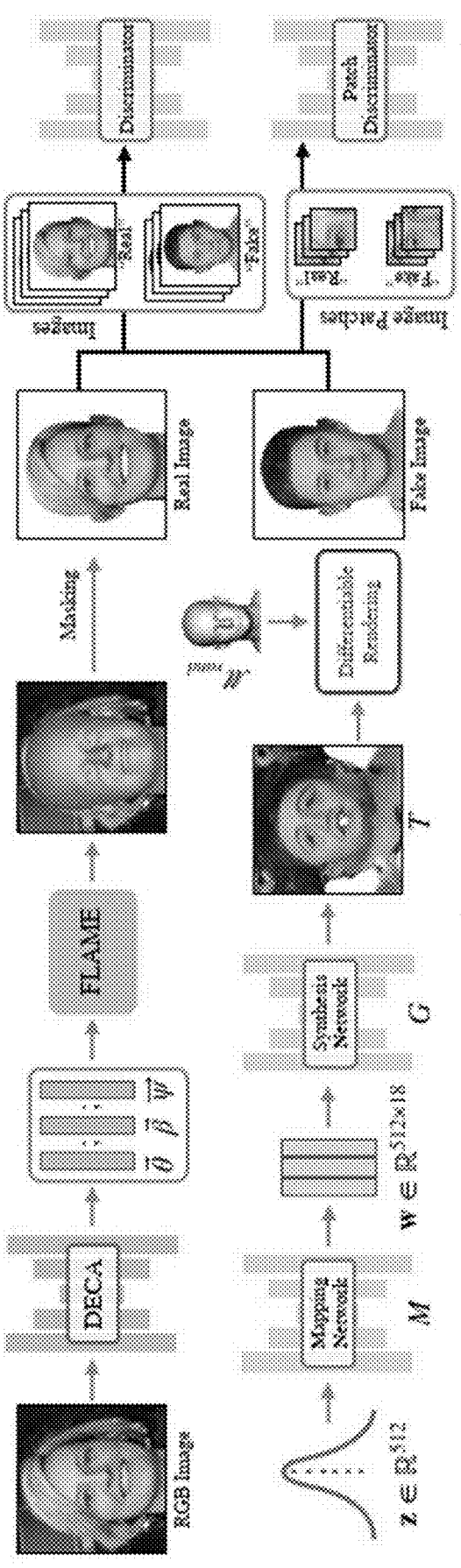
FIG. 2 schematically shows a texture generation.

Since there do not exist any large-scale datasets for UV textures, we propose a self-supervised method to learn the appearance manifold of human faces, as depicted in FIG. 2. FIG. 2 schematically shows a texture generation. A self-supervised texture generation is learned from collections of 2D images. An RGB image (upper row, left) is encoded by a pretrained encoder DECA (which is described in more detail for example in [10]) to extract shape $\vec{\beta}$, pose $\vec{\theta}$ and expression $\vec{\psi}$ coefficients in FLAME's latent space, which are decoded by FLAME mode (which is described in more detail in [30]) to deformed mesh vertices. The background and mouth interior are then masked out, generating the "Real Image" for the adversarial formulation. In parallel, latent code $z \in \mathbb{R}^{512}$ is sampled from $\mathcal{N}(0,I)$ (which is the normal distribution with expected value 0 and variance 1) and input to mapping network M to generate intermediate latent $w \in \mathbb{R}^{512}$, which is used by synthesis network G to generate the UV texture image. The predicted texture is differentially rendered (as described in more detail for example in [26]) on a randomly deformed FLAME mesh to generate the "Fake Image". Two discriminators interpret the generated and masked real image, at full resolution and at patch size 64×64. Through this document frozen models are denoted in blue, and learnable networks in green (or for example when adapted top black and white frozen models may be denoted in solid and learnable networks in dashed).

In more detail: Rather than learn texturing from ground truth UV textures, we instead leverage large-scale RGB image datasets of faces, which we use in an adversarial formulation through differentiable rendering. For our experiments, we use the FFHQ dataset (see [21]), which consists of 70,000 diverse, high-quality images. As we focus on the texture of the human head, we remove images that contain headwear (caps, scarfs, etc.) and eyewear (sunglasses and spectacles) using face parsing (see [46]) resulting in a subset of 45,000 images. Based on this data, we train a StyleGAN generator (as shown in [20]) to produce UV textures that when rendered on top of the FLAME mesh (as shown in [30]) results in realistic imagery.

More specifically, we use the FLAME model as our shape prior to produce different geometric shapes and facial expressions. It can be defined as:

$$\mathcal{F}(\vec{\beta}, \vec{\theta}, \vec{\psi}) : \mathbb{R}^{|\vec{\beta}| \times |\vec{\theta}| \times |\vec{\psi}|} \rightarrow \mathbb{R}^{3N}, \tag{1}$$

where $\vec{\beta} \in \mathbb{R}^{100}$ are the shape parameters, $\vec{\theta} \in \mathbb{R}^9$ the yaw pose, and $\vec{\psi} \in \mathbb{R}^{50}$ the linear expression coefficients. To recover the distribution of face shapes and expressions from the training dataset, we employ DECA (as shown in [10]), a pretrained encoder that takes an RGB image as input and outputs the corresponding FLAME parameters $\vec{\beta}$, $\vec{\theta}$, $\vec{\psi}$, including orthographic camera parameters c. We use the recovered parameters to remove the backgrounds from the original images, and only keep the image region that is covered by the corresponding face model. Using this distribution of face geometries and camera parameters $\mathcal{D} \sim [\vec{\beta}, \vec{\theta}, \vec{\psi}, c]$, along with the masked real samples, we train the StyleGAN network using differentiable rendering (as shown in [26]). We sample a latent code $z \in \mathbb{R}^{512}$ from Gaussian distribution $\mathcal{N}(0, \mathbf{I})$ to generate the intermediate latent code $w \in \mathbb{R}^{512 \times 18}$ using the a mapping network M: w=M(z). This latent code w is passed to the synthesis network G to generate UV texture map $T \in \mathbb{R}^{512 \times 512 \times 3}$: T=G(w). This predicted texture T is then rendered on a randomly sampled deformed mesh from our discrete distribution of face geometries $\mathcal{D}$. We use an image resolution of 512×512. Both the generated image and masked real image are then passed to the discriminator during training. To generate high-fidelity details in the UV maps, we use a patch discriminator alongside a full-image discriminator to critique the generator. We apply image augmentations (e.g., color jitter, image flipping, hue/saturation changes) to both full-image and image patches before feeding them to the discriminator. The patch size is set to 64×64 for all of our experiments. Note that the patch discriminator is critical to producing high-frequency texture details; see below (Results).

3.2 Text-Guided Synthesis of Textured 3D Models

Figure 3:
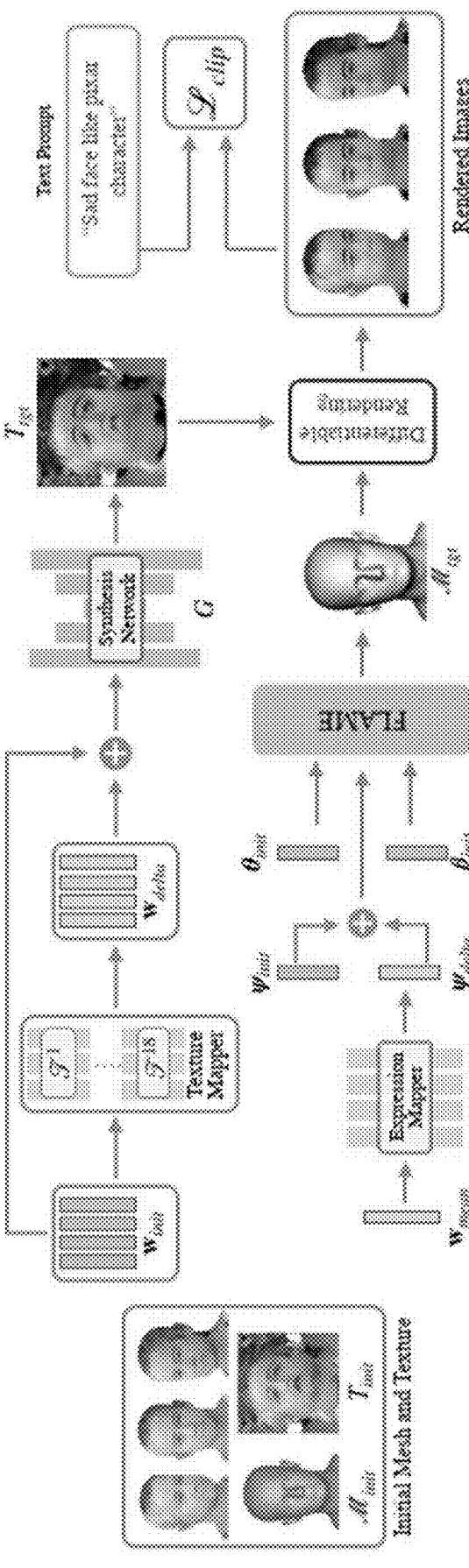
FIG. 3 schematically shows a text-guided synthesis of textured 3D face models.

FIG. 3 schematically shows a text-guided synthesis of textured 3D face models. From a given textured mesh with texture code $w_{init}$, we synthesize various styles by adapting both texture and expression to an input text prompt. $w_{init}$ is input to the texture mappers $\mathcal{T} = [\mathcal{T}^1, \ldots, \mathcal{T}^{18}]$ to obtain texture offsets $w_{delta} \in \mathbb{R}^{512 \times 18}$ for 18 different levels of $w_{init}$. The expression mapper $\varepsilon$ takes mean latent code $w_{mean} = \|w_{init}\|_2$ as input, and predicts expression offset $\psi_{delta}$ to obtain deformed mesh geometry $M_{tgt}$. The generated UV map $T_{tgt}$ and deformed mesh $M_{tgt}$ are differentiably rendered to generate styles that fit the text prompt. It holds $w_{tgt} = w_{delta} + w_{init}$ and $\psi_{tgt} = \psi_{delta} + \psi_{init}$.

In more detail: For a given textured mesh with texture code $$w_{init} = \{w_{init}^1, w_{init}^2, \ldots w_{init}^{18}\}$$

$\in \mathbb{R}^{512 \times 18}$ in neutral pose $\theta_{init}$ and neutral expression $\psi_{init}$, our goal is to learn optimal offsets $w_{delta}$, $\psi_{delta}$ for texture and expression respectively defined through text prompts. As a source of supervision, we use a pretrained CLIP mode as shown [38] in due to its high expressiveness, and formulate the offsets as:

$$w_{delta}^*, \psi_{delta}^* = _{w_{delta}, \psi_{delta}} \mathcal{L}_{total}, \tag{2}$$

where $\mathcal{L}_{total}$ formulates CLIP guidance and expression regularization, as defined in Eq. 9. In order to optimize this loss, we learn a texture mapper $\mathcal{T} = [\mathcal{T}^1, \ldots, \mathcal{T}^{18}]$ and an expression mapper $\varepsilon$. The texture mapper predicts the latent variable offsets across the different levels $\{1, 2, \ldots 18\}$ of the StyleGAN generator:

$$w_{delta} = \begin{cases} \mathcal{T}^1(w_{init}^1) \\ \mathcal{T}^2(w_{init}^2) \\ \vdots \\ \mathcal{T}^{18}(w_{init}^{18}) \end{cases}. \tag{3}$$

The expression mapper $\varepsilon$ learns the expression offsets and takes as input $w_{mean} \in \mathbb{R}^{512}$, the mean of 18-different levels of the latent space, and outputs the expression offsets $\psi_{delta}$:

$$\psi_{delta} = \mathcal{E}(w_{mean}). \tag{4}$$

We use a 4-layer MLP architecture with ReLU activations for the mappers. (see also FIG. 3). Naively using a CLIP loss as in StyleClip (shown in [36]) to train the mappers tends to result in unwanted identity and/or illumination changes in texture. Thus, we draw inspiration from Gal (see [11]), and leverage the CLIP-space direction between the initial style and the to-be-performed manipulation in order to perform consistent and identity-preserving manipulation. We compute the 'text-delta' direction $\Delta t$ in CLIP-space between the initial text prompt $t_{init}$ and the target text prompt $t_{tgt}$, indicating which attributes from the initial style should be changed:

$$\Delta t = E_T(t_{tgt}) - E_T(t_{init}). \tag{5}$$

Guided via the CLIP-space image direction between the initial image $i_{init}$ and the target image $i_{tgt}$ generated using our textured model, we train the mapping networks to predict style, guided by a given text prompt:

$$\Delta i = E_I(i_{tgt}) - E_I(i_{init}), \tag{6}$$

where $i_{init}$ is the image rendered with initial parameters $(w_{init}, \beta_{init}, \theta_{init}, \psi_{init})$ and $i_{tgt}$ the image with the target parameters $(w_{tgt}, \beta_{tgt}, \theta_{tgt}, \psi_{tgt})$. The terms $E_T$ and $E_I$ refer to clip encoder for text and image respectively (see also CLIP reference [36] and/or [38]).

Note that we do not alter the pose $\theta$ and shape code $\beta$ of the FLAME model. The CLIP loss $\mathcal{L}_{clip}$ is then computed as:

$$\mathcal{L}_{clip} = 1 - \frac{\Delta i \cdot \Delta t}{|\Delta i||\Delta t|}. \tag{7}$$

In order to prevent the mesh from taking unrealistic expressions, we further regularize the expressions using the Mahalanobis prior as:

$$\mathcal{L}_{reg} = \psi^T \sum_\psi^{-1} \psi, \tag{8}$$

where $$\sum_{\psi}^{-1}$$

is the diagonal expression covariance matrix of FLAME model. The full training loss can then be written as:

$$\mathcal{L}_{total} = \mathcal{L}_{clip} + \lambda_{reg}\mathcal{L}_{reg}. \tag{9}$$

Note that we can also only alter the texture without changing expressions by keeping the expression mapper frozen and not fine-tuning it.

3.3 Texture Manipulation for Video Sequences

Figure 4:
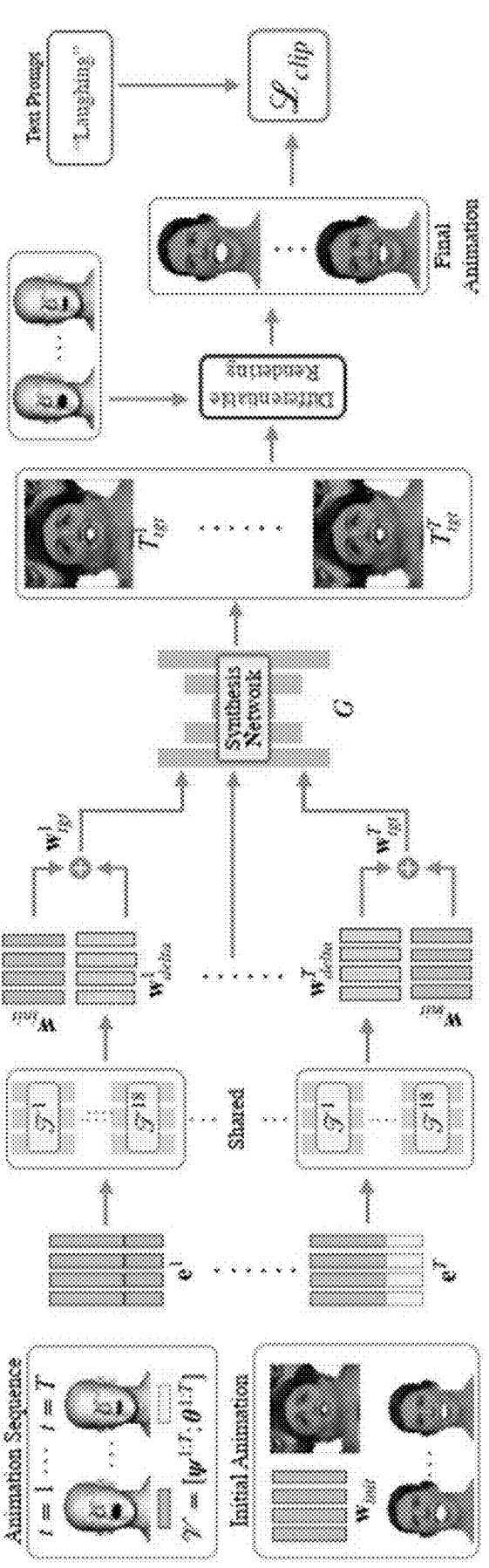
FIG. 4 schematically shows a texture manipulation for animation sequences.

FIG. 4 schematically shows a texture manipulation for animation sequences. Based in a given a video sequence $\mathcal{V} =[\psi^{1:T};\theta^{1:T}]$ T frames, an initial texture code $w_{init}$, and a text prompt, we synthesize a 3D textured animation to match the text. The $\mathcal{V}$ to $w_{init}$ are concatenate across different timestamps to obtain $e^t$, which is input to the time-shared texture mappers $\mathcal{T}$ to obtain time-dependent textures offsets $$w_{delta}^{1:T}$$

for all frames. The new texture codes $$w_{tgt}^{1:T}$$

are then passed to the texture generator G to obtain time-dependent UV textures $$T_{tgt}^{1:T},$$

which are then differentiably rendered to generate the final animation, guided by the CLIP loss across all frames.

In more detail: Given an expression video sequence, we propose a novel technique to manipulate the textures for every frame of the video guided by a CLIP loss (see FIG. 4). That is, for a given animation sequence $\mathcal{V} =[\theta^{1:T};\psi^{1:T}]$ of T frames, with expression codes $\psi^{1:T}=[\psi^1,\psi^2, \ldots \psi^T]$, pose codes $\theta^{1:T}=[\theta^1,\theta^2,\ldots \theta^T]$, and a given texture code $w_{init}$, we use a multi-layer perception as our texture mapper $\mathcal{T} = [\mathcal{T}^1,\ldots,\mathcal{T}^{18}]$ to generate time-dependent texture offsets $$w_{delta}^{1:T}$$

for different levels of the texture latent space. This mapper receives as input $e^{1:T}$, the concatenation of the initial texture code $w_{init}$ with the time-dependent expression and pose code $[\psi^t;\theta^t]$. Mathematically, we have:

$$e^{1:T} = [e^1, \ldots e^T] \tag{10}$$

$$e^t = [w_{init}; \psi^t; \theta^t], \tag{11}$$

where $\psi^t$ and $\theta^t$ refer to the expression and pose code at timestamp t extracted from sequence $\mathcal{V}$. Next, we pass $e^{1:T}$ to the time-shared texture mapper $\mathcal{T}$ to obtain texture offsets $$w_{delta}^{1:T}.$$

To ensure a coherent animation and smooth transition across frames, we weight the predicted offsets $$w_{delta}^{1:T}$$

using importance weights $\jmath=[i_1, \ldots i_T]$ extracted from video sequence $\mathcal{V}$, before adding them to $w_{init}$.

$$w_{tgt}^t = w_{init} + i_t \cdot w_{delta}^t. \tag{12}$$

We compute importance weights by measuring the deviation between the neutral shape $[\theta_{neutral};\psi_{neutral}]$ and per-frame face shape $[\theta^t;\psi^t]$, with by min-max normalization:

$$i_t = \frac{\delta^t - \min(\delta^{1:T})}{\max(\delta^{1:T}) - \min(\delta^{1:T})}, \tag{13}$$

with $\delta^t=\|[\theta_{neutral};\psi_{neutral}]-[\theta^t;\psi^t]\|_2$. The importance weighting ensures that key frames with strong expressions are emphasized. The predicted target latent codes $$w_{tgt}^{1:T}$$

are then used to generate the UV maps $$T_{tgt}^{1:T},$$

which are differentiably rendered onto the given animation sequence $\mathcal{V}$. To train texture mapper $\mathcal{T}$, we minimize Eq. 7 for the given text prompt $t_{tgt}$ and the rendered frames $i_{tgt}^t$ aggregated over T timesteps for all the frames from the video.

$$w_{delta}^{1:T} = _{w_{delta}^{1:T}} \sum_{t=1}^{T} \mathcal{L}_{clip}(t_{tgt}, i_{tgt}^t). \tag{14}$$

Results of the text-guided editing of a textured 3D morphable model as described above, are for example shown on FIG. 1.

FIG. 1 shows given 3D mesh with fixed topology, and an arbitrary generated face textures as texture maps texture (also referred to as UV maps) and renderings from multiple viewpoints which are based thereon (top row on the left). The textured mesh can then be manipulated with text guidance to generate diverse set of textures and geometric expressions in 3D by altering (a) only the UV texture maps for Texture Manipulation and (b) both UV maps and mesh geometry for Expression Manipulation. This is based on the method described below (also referred to "ClipFace") which learns a self-supervised generative model for jointly synthesizing geometry and texture leveraging 3D morphable face models, that can be guided by text prompts.

4. Results

We evaluate on the tasks of texture generation, text-guided synthesis of textured 3D face models, and text-guided manipulation of animation sequences. For texture generation, we evaluate on standard GAN metrics FID and KID. For text-guided manipulation, we evaluate perceptual quality using KID in addition to CLIP score, which is evaluated as the cosine similarity to the text prompt using pre-trained CLIP models. We use two different CLIP variants, 'ViT-B/16' and 'ViT-L/14', each on 224×224 pixels as input. We report average scores for these pre-trained variants.

The results shown below may be obtained with the following implementation: For our texture generator, we produce 512×512 texture maps. We use an Adam optimizer with a learning rate of 2e-3, batch size 8, gradient penalty 10, and path length regularization 2 for all our experiments. We use a learning rate of 0.005 and 0.0001 for the expression and texture mappers, also using Adam. For differentiable rendering, we use NvDiffrast (see [26]). For the patch discriminator, we use a patch size of 64×64. We train for 300,000 iterations until convergence. For the text-guided manipulation experiments, we use the same model architecture for expression and texture mappers, a 4-layer MLP with ReLU activations. For CLIP supervision, we use the pre-trained 'ViT-B/32' variant. For text manipulation tasks, we train for 20,000 iterations

Texture Generation

Figure 5:
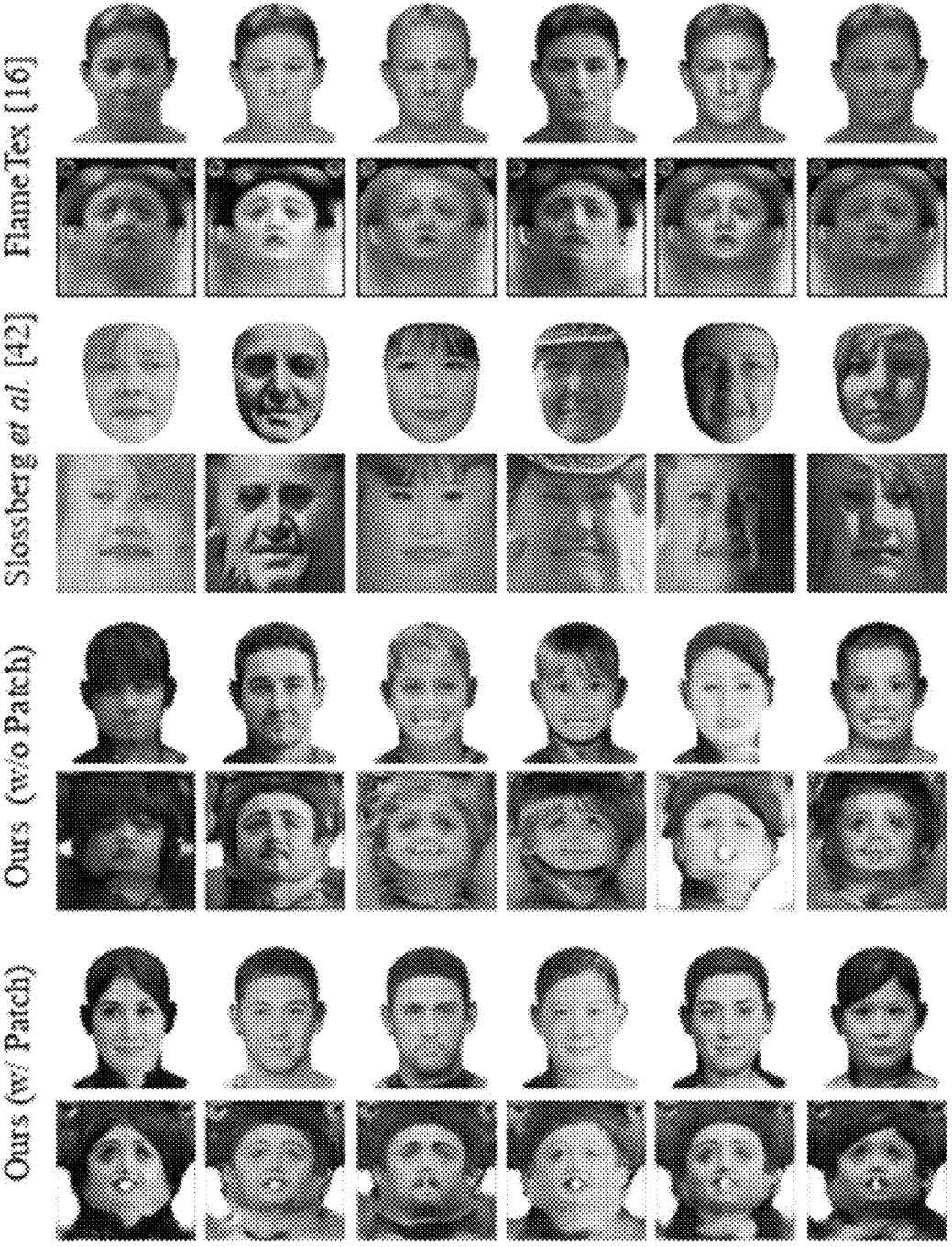
FIG. 5 shows a comparison of different texturing quality.

We evaluate the quality of our generated textures and compare with existing unsupervised texture generation methods in Table 1 and FIG. 5 outperforms other baselines in perceptual quality. Although Slossberg (see [42]) can obtain good textures for the interior face region, it does not synthesize head and ears.

FIG. 5 shows a comparison of different texturing quality. The approach described in this invention ("ours") is able to synthesize diverse texture styles ranging across different skin colors, ethnicities, and demographics.

TABLE 1

Quantitative evaluation of texture quality. Our approach significantly outperforms baselines in both FID and KID scores.

| Method | FID ↓ | KID ↓ |
| --- | --- | --- |
| FlameTex([16]) | 76.627 | 0.063 |
| Slossberg ([42]) | 32.794 | 0.021 |
| Ours (w/o Patch) | 14.622 | 0.010 |
| Ours (w/Patch) | 8.859 | 0.003 |

Texture & Expression Manipulation

Figure 6:
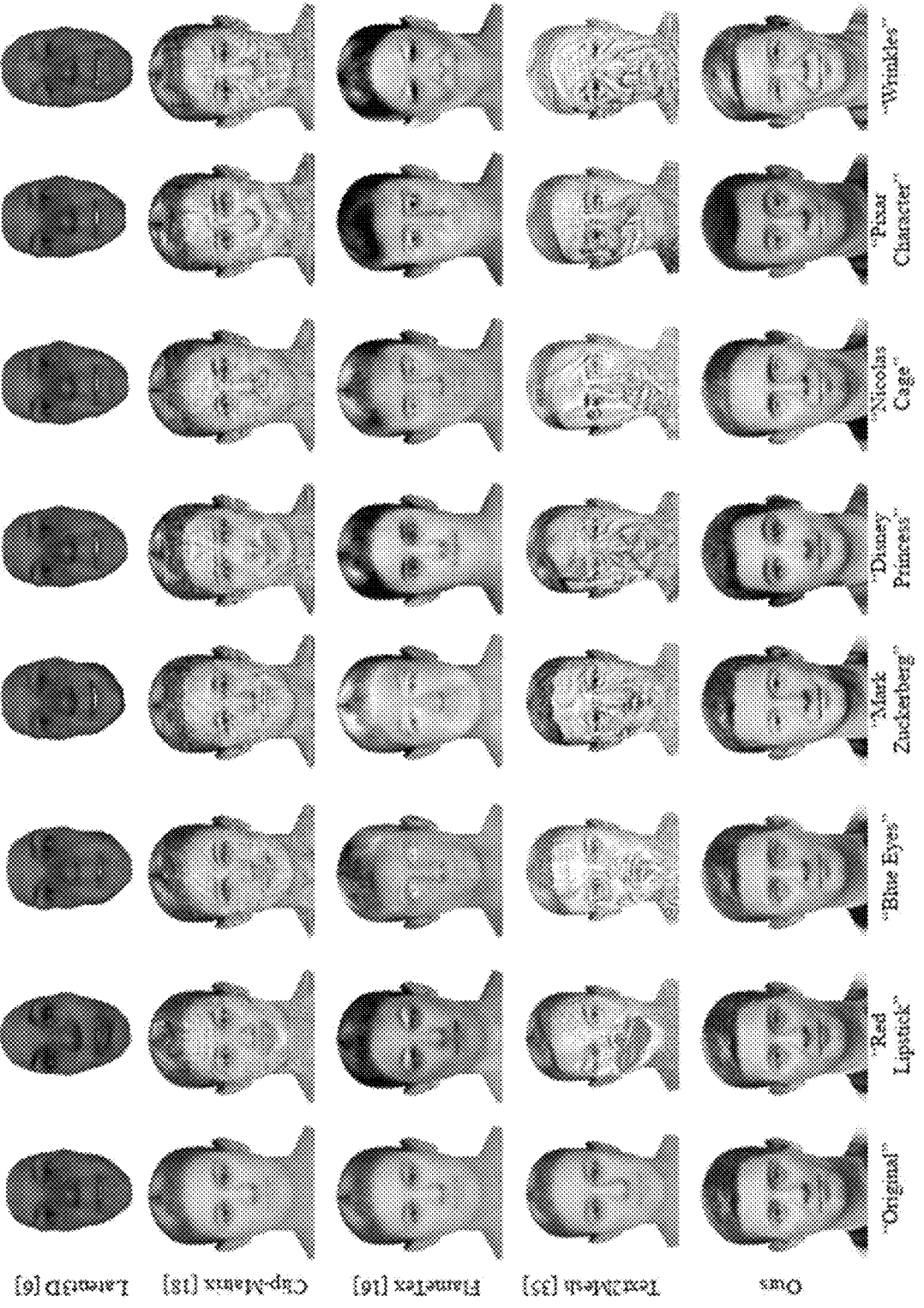
FIG. 6 shows a qualitative comparison for texture manipulation.

We compare with CLIP-based texturing techniques for texture manipulation in FIG. 6 and Table 2.

FIG. 6 shows a qualitative comparison for texture manipulation. The method described in this invention ("ours") is compared against several 3D texturing methods. The method described in this invention obtains consistently high-quality textures, even capable deftly adapting identity when guided by text prompt.

Note that for comparisons with Text2Mesh (see [35]), we follow the authors' suggestion to first perform remeshing to increase vertices from 5023 to 60,000 before optimization. Our approach generates consistently high-quality textures for various prompts, in comparison to baselines. In particular, our texture generator enables high-quality editing even in small face regions (e.g., lips and eyes). Note that Text2Mesh yields a high CLIP score, while producing semantically implausible results, as the specified text prompts highly match rendered colors irrespective of the global face context (i.e., which region should be edited). In contrast, our method also generates high-quality face texture, evident in the perceptual KID metric.

TABLE 2

Evaluation of text manipulation. effectively matches text prompts while maintaining high perceptual fidelity.

| Method | KID ↓ | CLIP Score ↑ |
| --- | --- | --- |
| Latent3d ([6]) | 0.221 | 0.227 ± 0.041 |
| FlameTex ([16]) | 0.014 | 0.235 ± 0.053 |
| ClipMatrix ([18]) | 0.138 | 0.243 ± 0.049 |
| Text2Mesh ([35]) | 0.146 | 0.264 ± 0.044 |
| Invention | 0.004 | 0.251 ± 0.059 |

Figure 7:
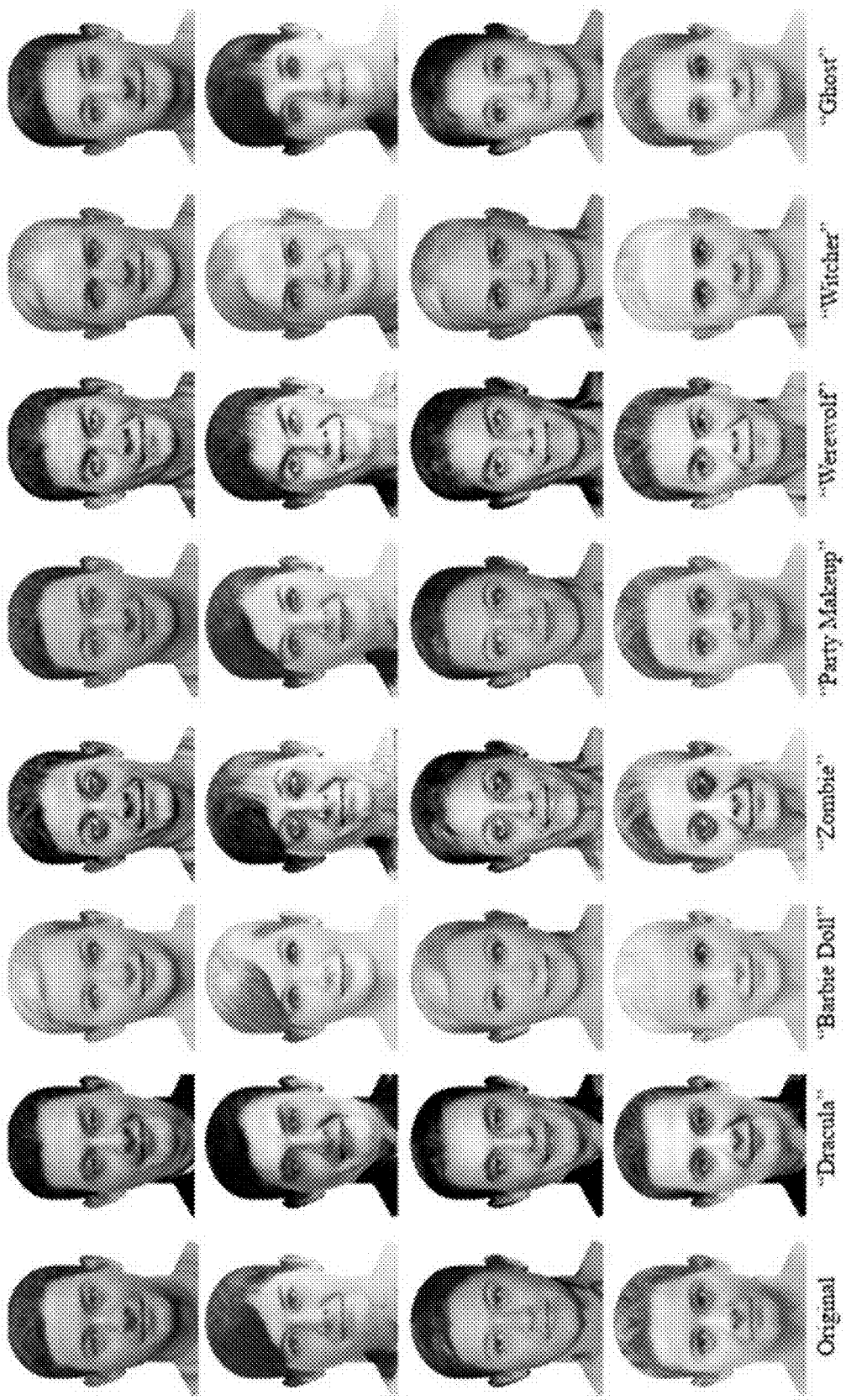
FIG. 7 shows texture manipulations.

We show additional texturing results on a wide variety of prompts, including on fictional characters, in FIG. 7, demonstrating our expressive power.

FIG. 7 shows texture manipulations. 'Original' (left) shows the input image, followed by textures ("Dracula" to "Ghost") generated as described in this invention (see above) for the text prompts.

Figure 9:
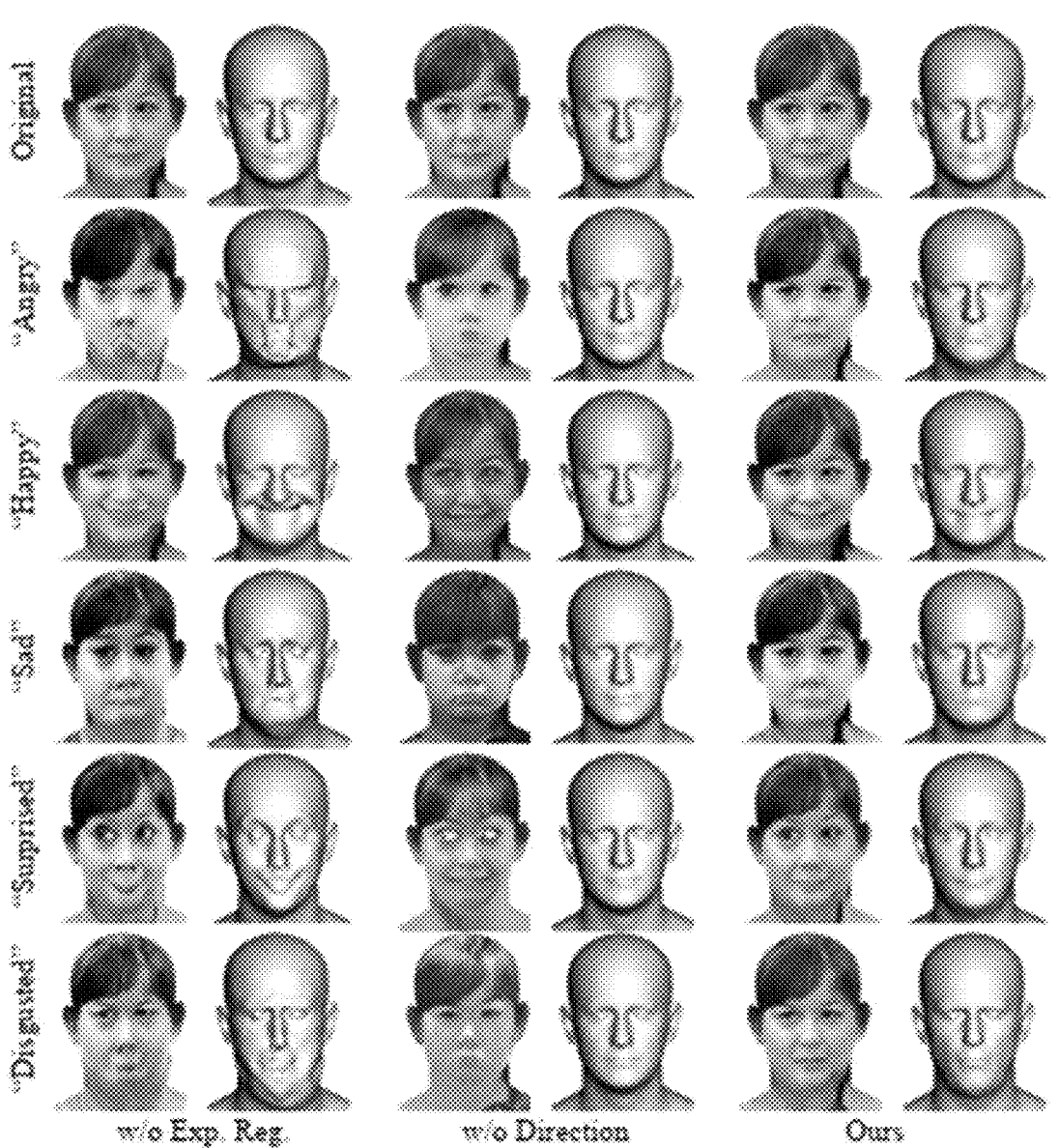
FIG. 9 shows results for expression manipulation.

Furthermore, FIG. 9 shows results for expression manipulation. The method described in this invention (also called "ClipFace") generates a large variety of expressions, faithfully deforming the mesh geometry and manipulating texture for more expressiveness. The applied expression regularization is important to produce realistic geometric expressions, and directional loss for balanced manipulation of both texture and geometry.

The application of the method described herein faithfully deforms face geometry and texture to match a variety of text prompts, where expression regularization maintains plausible geometry and directional loss enables balanced adaptation of geometry and texture. We refer to the supplemental for more visuals.

Texture Manipulation for Video Sequences

Figure 8:
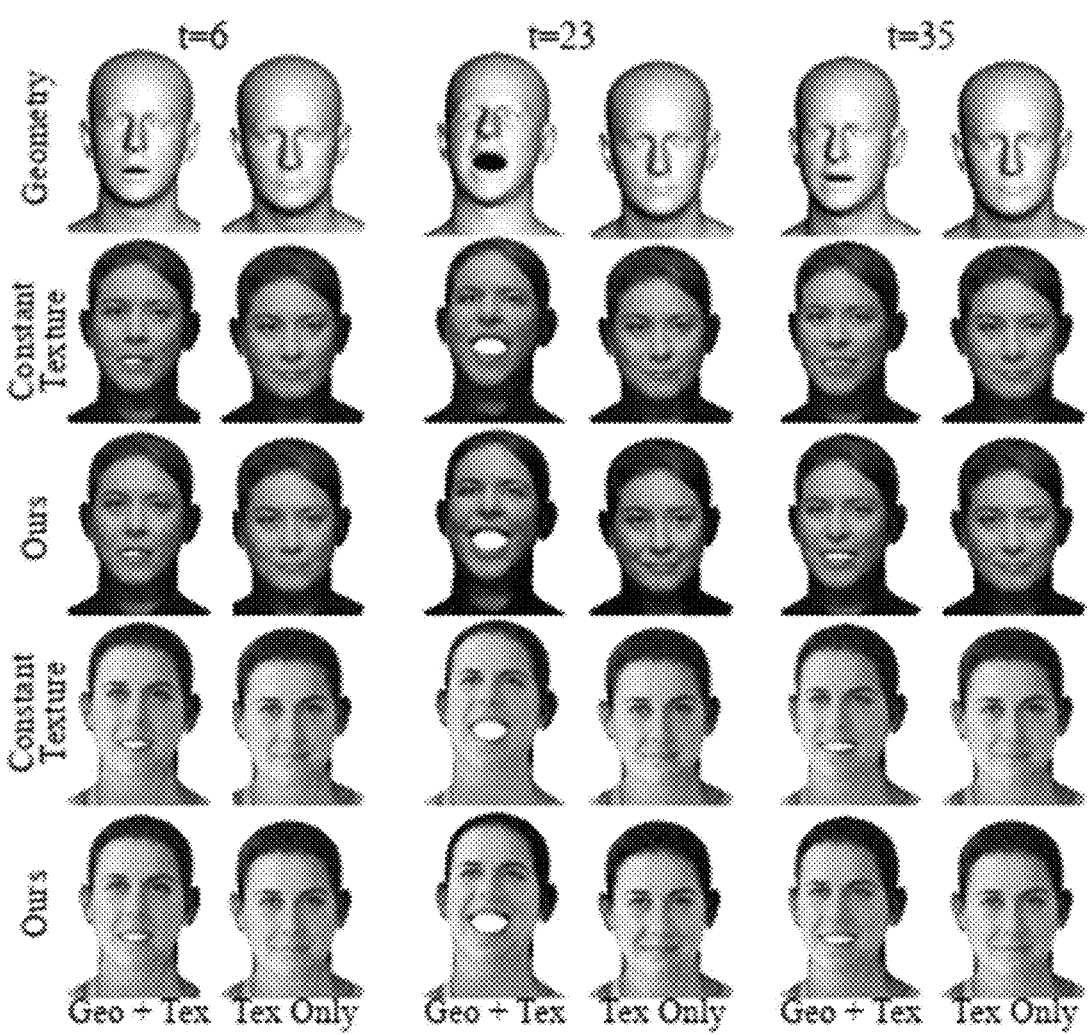
FIG. 8 shows expression manipulation that generates video sequences.

Finally, we show results for texture manipulation for given animation sequences in FIG. 8.

FIG. 8 shows expression manipulation that generates video sequences. "Geo+Tex" shows textures overlaid on the animated mesh, and "Tex Only" shows texture in the neutral pose. The ability to manipulate texture based on the method described in this invention (see above) enables more compelling animation, particularly in articulated expressions (e.g., t=23)

The method described herein ("ClipFace") can produce more expressive animation compared to a constant texture that looks monotonic. We show results for only 3 frames; however, we refer readers to the supplemental video for more detailed results. We may or may not explicitly consider semantic parts, which could help to provide even finer-grained localization of manipulations and facial detail.

5. Conclusion

To conclude (for purposes of understanding without limiting effect): In this invention we have introduced, a novel approach to enable text-guided editing of textured 3D morphable face models. We jointly synthesize high-quality textures and adapt geometry based on the expressions of the morphable model, in a self-supervised fashion. This enables compelling 3D face generation across a variety of textures, expressions, and styles, based on user-friendly text prompts. We further demonstrate the ability of to synthesize of animation sequences, driven by a guiding video sequence. We believe this is an important first step towards enabling controllable, realistic texture and expression modeling for 3D face models, dovetailing with conventional graphics pipelines, which will enable many new possibilities for content creation and digital avatars.

II. FURTHER EMBODIMENTS

Figure 10:
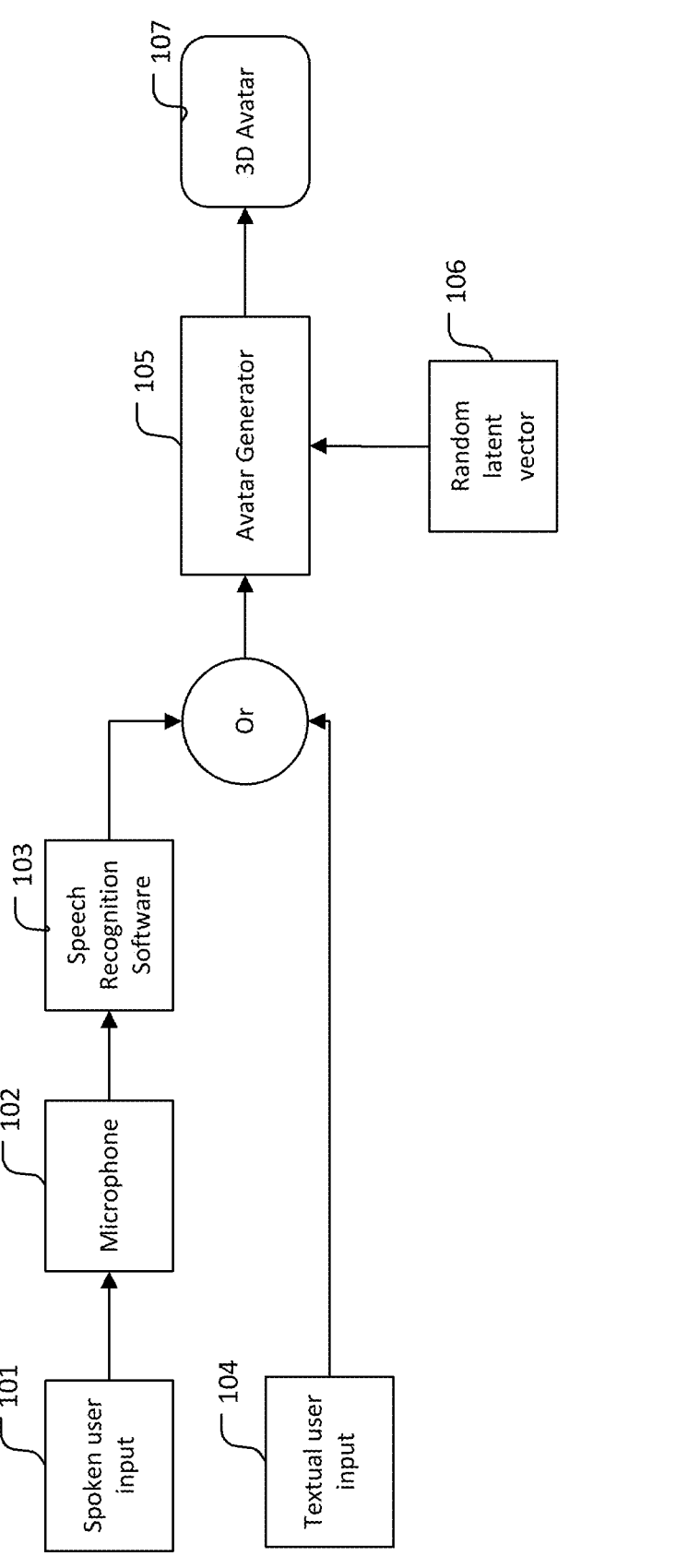
FIG. 10 shows a flowchart of the generation of a desired avatar with regards to a user input.

FIG. 10 shows a flowchart of the generation of a desired avatar (an avatar is a type of object, which may be based on a model of a human face or human body) with regards to a user input. In step 101 a user inputs a spoken description of a desired avatar as user speech input into a microphone 102. In step 103 the spoken language of the speech input of the user is input into a speech recognition software (see above) that transcribes the speech into a text. In an alternative input way, in step 104 a user inputs a written description of a desired avatar as user speech input into the system. The user input in text form (either transformed or directly input) is input to the avatar generator 105 (also called "ClipFace", see method described above). Further, a random latent vector of a texture map 106 is input into the avatar generator 105. Then, the avatar generator 105 determines the desired avatar 107.

Figure 11:
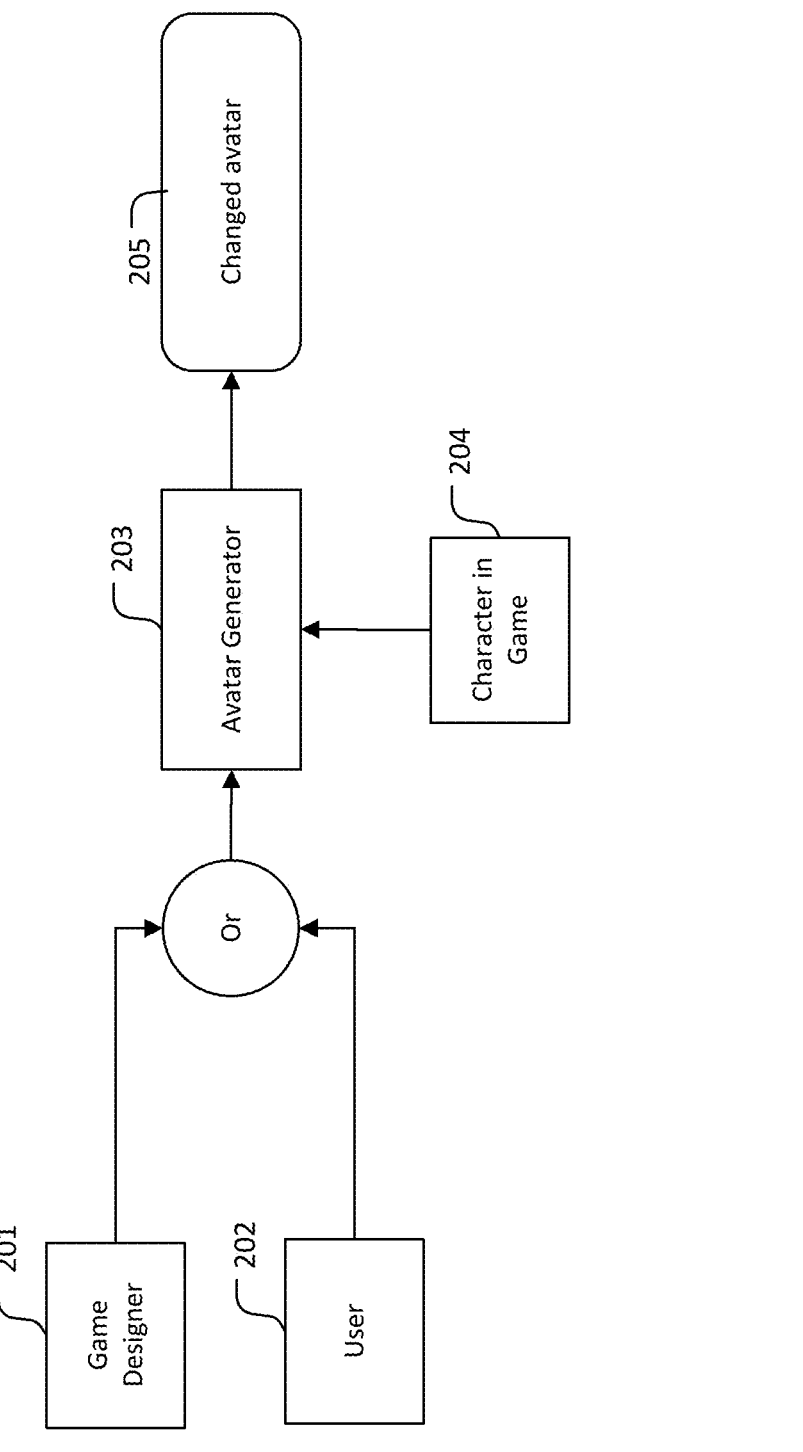
FIG. 11 shows a flowchart of different use cases for changing of an existing avatar with regards to a user input.

FIG. 11 shows a flowchart of different use cases for changing of an existing avatar with regards to a user input. In step 201 a game designer formulates a description (via text or speech, see FIG. 1) of a desired changing of an avatar in a game, for example with regards to a desired market-dependent change to existing characters in a game. For example, if a game is sold in additional country the existing avatars may be adapted to the phenotype (i.e., ethnicity) of the people living in this additional country. In an alternative motivation for the usage of changing of an existing avatar with regards to a user input, in step 202, a user formulates a description (via text or speech, see FIG. 1) of a desired changing of an avatar for personalizing it. For example, with regards to the own looks of a user/player (young old, black/white etc.) or certain other desired expectations. For example, an existing avatar with a short nose is changed to an avatar with a long nose etc. In step 203 the avatar is changed with regards to the user input, which is described below in more detail and outputs the desired changed avatar 205 (which yields a game with characters corresponding to the desired attributes).

Further or additional, the avatars may be adapted to folkloristic depictions of characters (zombies in one country, ghosts in another).

In another embodiment the above-described flow chart can also be applied to films/movies instead of games, where the avatars may play roles of (minor) characters.

The method (for user command-guided editing of an initial textured 3D morphable model) described above nay also generate object or human avatars randomly or according to attributes a user command comprising certain attributes.

For example, a game designer says a user command into a microphone "generate 20 angry avatars", and the method as described above generates 20 random angry 3D avatars.

The method described above may generate avatars randomly from scratch or modify existing avatars, for example by adding add red lipstick to it.

Further the avatars' movements can be controlled by speech commands as well. The designer could say "30 fearful avatars with clown make-up run randomly with their arms to their skies".

The generated avatars may be photorealistic or stylized.

III. Implementation

Figure 12:
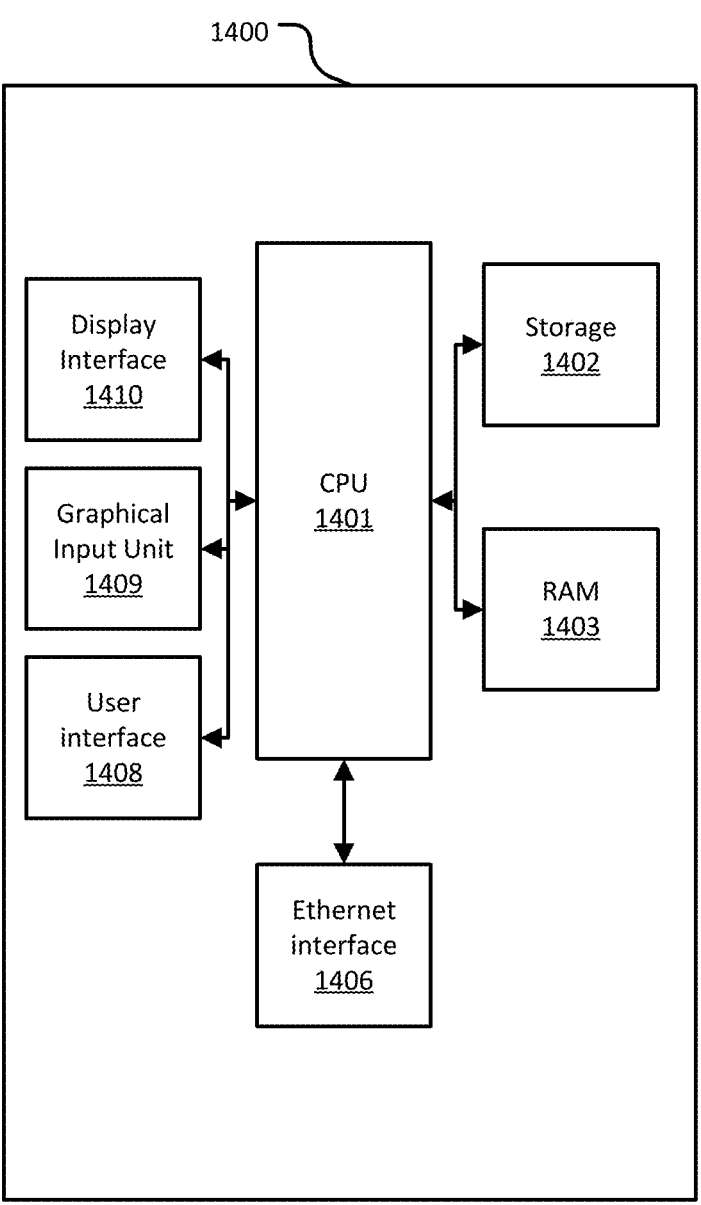
FIG. 12 schematically describes an embodiment of an electronic device which may implement the functionality of the method for user command-guided editing of an initial textured 3D morphable model of an object.

FIG. 12 schematically describes an embodiment of an electronic device which may implement the functionality of the method for user command-guided editing of an initial textured 3D morphable model of an object as described above. The electronic device 1400 comprises a CPU 1401 as processor. The electronic device 1400 further comprises a GPU 1406 that is connected to the processor 1401. The electronic system 1400 further comprises an Ethernet interface 1404 which acts as interface for data communication with external devices. The electronic device 1400 further comprises a data storage 1402 and a data memory 1403 (here a RAM). The data memory 1403 is arranged to temporarily store or cache data or computer instructions for processing by the processor 1401. The data storage 1402 is arranged as a long-term storage, e.g., for images. The electronic device 1400 further comprises a graphical input unit. The electronic device 1400 further comprises a display interface 1410 which could be a touch screen display.

It should be recognized that the embodiments describe methods with an exemplary ordering of method steps. The specific ordering of method steps is, however, given for illustrative purposes only and should not be construed as binding.

It should also be noted that the division of the electronic device of FIG. 12 etc. into units is only made for illustration purposes and that the present disclosure is not limited to any specific division of functions in specific units. For instance, at least parts of the circuitry could be implemented by a respectively programmed processor, field programmable gate array (FPGA), dedicated circuits, and the like.

All units and entities described in this specification and claimed in the appended claims can, if not stated otherwise, be implemented as integrated circuit logic, for example, on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below:

(1) A method for user command-guided editing of an initial textured 3D morphable model (M_init, T_init) of an object comprising:

obtaining the initial textured 3D morphable model (M_init, T_init) of the object comprising an initial texture map of the object (T_init) and an initial 3D mesh model (M_init) of the object; and determining an edited texture map (T_tgt) of the object corresponding to the user command by editing the initial texture map of the object (T_init) based on a first artificial neural network (T_1, . . . , T_18); and/or determining an edited 3D mesh model (M_tgt) of the object corresponding to the user command by editing the initial 3D mesh model (M_init) of the object based on a second artificial neural network (E); and generating an edited textured 3D morphable model (M_tgt, T_tgt) of the object corresponding to the user command based on the edited texture map (T_tgt) of the object and/or the edited 3D mesh model (M_tgt) of the object.

(2) The method of (2), further comprising:

generating the initial texture map of the object (T_init) and a corresponding initial texture latent code (w; w_init) based on a third artificial neural network (G, M); and/or generating the initial 3D mesh model (M_init) of the object based on an initial general appearance parameter (psi_init) of the 3D mesh model.

(3) The method of (1) or (2), further comprising:

determining an offset texture latent code (w_delta) based on the initial texture latent code (w_init) by the first artificial neural network (T_1, . . . , T_18) corresponding to the user command, and determining the edited texture map (T_tgt)) of the object by the third artificial neural network (G, M) based on the offset texture latent code (w_delta); and/or determining an offset general appearance parameter (psi_delta) of the 3D mesh model based on the initial texture latent code (w_init; w_mean) by the second artificial neural network (E) corresponding to the user command, and determining the edited 3D mesh model (M_tgt) of the object based on the offset general appearance parameter (psi_delta).

(4) The method of anyone of (1) to (3), wherein the object is a human face and the initial 3D mesh model (M_init) is a FLAME model and the initial general appearance parameter of the 3D mesh model is linear expression coefficients (psi_initi); and/or wherein the object is a human person or parts thereof, and the initial 3D mesh model (M_init) is a SMPL-X model and the initial general appearance parameter of the 3D mesh model is a jaw joint parameter, finger joints parameter, remaining body joints parameter, combined body, face, hands shape parameters and/or facial expression parameters ($\theta_f$, $\theta_h$, $\theta_b$, $\beta$, $\psi$)

(5) The method of anyone of (1) to (4), wherein the first artificial neural network (T_1, . . . , T_18) and/or the second artificial neural network (E) are trained based on one or more texture maps (T_init) and corresponding texture latent codes (w_init), wherein the texture maps (T_init) and corresponding texture latent codes (w_init) are generated based on a third artificial neural network (G, M).

(6) The method of anyone of (2) to (5), wherein the third artificial neural network (G, S) is trained by an adversarial self-supervised training.

(7) The method of (6), wherein the third artificial neural network (G) is trained based on a plurality of RGB images.

(8) The method of anyone of (1) to (7), wherein the first artificial neural network (T_1, . . . , T_18) and/or the second artificial neural network (E) are trained with regards to a loss function (L_total; L_clip; L_reg) which is based on a pre-trained vision-language model (CLIP) supervision and the user command.

(9) The method of (8), wherein a difference measure (Dt; Di; E_T; E_I) is determined between the user command and a descriptive text, which is generated by the pre-trained vision-language model, of a visual context in a rendered image based on the edited textured 3D morphable model (M_tgt, T_tgt) of the object.

(10) The method of (8) or (9), wherein the first artificial neural network (T_1, . . . , T_18) and/or the second artificial neural network (E) are trained based on a plurality of different user commands.

(11) The method of anyone of (1) to (10), further comprising:

rendering the edited texture map (T_tgt) of the object or the initial texture map (T_init) of the object together with the edited 3D mesh model (M_tgt) of the object or the initial 3D mesh model (M_init) of the object to obtain an image corresponding to the user command.

(12) The method of anyone of (1) to (11), further comprising transcribing the user command, which is a speech input in huma language, into a text.

(13) The method of anyone of (1) to (12), further comprising:

obtaining a plurality of different initial 3D mesh models (V) of the object; and determining a plurality of edited texture maps (T^1_tgt, T^T_tgt) of the object corresponding to the plurality of the initial 3D mesh models of the object (V) and the user command by jointly editing the initial texture map of the object (T_init) a plurality of times based on the first artificial neural network (T_1, . . . , T_18) and based on and the plurality of initial 3D mesh models (V); and generating a plurality of edited textured 3D morphable models (V, T^1_tgt, T^T_tgt) of the object corresponding to the user command based on the plurality of edited texture maps (T^1_tgt, T^T_tgt) of the object and on the plurality of initial 3D mesh models (V) of the object; and rendering the plurality of edited texture maps (T^1_tgt, T^T_tgt) of the object together with the plurality of initial 3D mesh models of the object (V) to obtain a plurality of images corresponding to the user command.

(14) An electronic device comprising circuitry configured to perform an user command-guided editing of an initial textured 3D morphable model (M_init, T_init) by carrying out:

obtaining the initial textured 3D morphable model (M_init, T_init) of the object comprising an initial texture map of the object (T_init) and an initial 3D mesh model (M_init) of the object; and determining an edited texture map (T_tgt) of the object corresponding to the user command by editing the initial texture map of the object (T_init) based on a first artificial neural network (T_1, . . . , T_18); and/or determining an edited 3D mesh model (M_tgt) of the object corresponding to the user command by editing the initial 3D mesh model (M_init) of the object based on a second artificial neural network (E); and generating an edited textured 3D morphable model (M_tgt, T_tgt) of the object corresponding to the user command based on the edited texture map (T_tgt) of the object and/or the edited 3D mesh model (M_tgt) of the object.

(15) A computer program comprising instructions which, when the program is executed by a computer, cause the computer to carry out the steps of (1).

REFERENCES

[1] Rameen Abdal, Peihao Zhu, John Femiani, Niloy J. Mitra, and Peter Wonka. Clip2stylegan: Unsupervised extraction of stylegan edit directions. CoRR, abs/2112.05219, 2021.

[2] Rameen Abdal, Peihao Zhu, Niloy J. Mitra, and Peter Wonka. Styleflow: Attribute-conditioned exploration of stylegan-generated images using conditional continuous normalizing flows. ACM Trans. Graph., May 2021.

[3] Omri Avrahami, Dani Lischinski, and Ohad Fried. Blended diffusion for text-driven editing of natural images. In Proceedings of the IEEE/CVF Conference on Computer Vision and Pattern Recognition, pages 18208-18218, 2022.

[4] David Bau, Alex Andonian, Audrey Cui, YeonHwan Park, Ali Jahanian, Aude Oliva, and Antonio Torralba. Paint by word, 2021.

[5] Volker Blanz and Thomas Vetter. A morphable model for the synthesis of 3d faces. In Proceedings of the 26th Annual Conference on Computer Graphics and Interactive Techniques, SIGGRAPH '99, page 187-194, USA, 1999. ACM Press/Addison-Wesley Publishing Co.

[6] Zehranaz Canfes, M. Furkan Atasoy, Alara Dirik, and Pinar Yanardag. Text and image guided 3d avatar generation and manipulation, 2022.

[7] Katherine Crowson. Vqgan-clip, 2021.

[8] Boris Dayma, Suraj Patil, Pedro Cuenca, Khalid Saifullah, Tanishq Abraham, Phuc Le Khac, Luke Melas, and Ritobrata Ghosh. Dall•e mini, 7 2021.

[9] Yu Deng, Jiaolong Yang, Dong Chen, Fang Wen, and Xin Tong. Disentangled and controllable face image generation via 3d imitative-contrastive learning. In IEEE Computer Vision and Pattern Recognition, 2020.

[10] Yao Feng, Haiwen Feng, Michael J. Black, and Timo Bolkart. Learning an animatable detailed 3D face model from in-the-wild images. ACM Transactions on Graphics (ToG), Proc. SIGGRAPH, 40(4):88:1-88:13, August 2021.

[11] Rinon Gal, Or Patashnik, Haggai Maron, Gal Chechik, and Daniel Cohen-Or. Stylegan-nada: Clip-guided domain adaptation of image generators, 2021.

[12] Baris Gecer, Alexander Lattas, Stylianos Ploumpis, Jiankang Deng, Athanasios Papaioannou, Stylianos Moschoglou, and Stefanos Zafeiriou. Synthesizing coupled 3d face modalities by trunk-branch generative adversarial networks. In Proceedings of the European conference on computer vision (ECCV). Springer, 2020.

[13] Baris Gecer, Stylianos Ploumpis, Irene Kotsia, and Stefanos Zafeiriou. Ganfit: Generative adversarial network fitting for high fidelity 3d face reconstruction. In Proceedings of the IEEE/CVF Conference on Computer Vision and Pattern Recognition (CVPR), June 2019.

[14] Baris Gecer, Stylianos Ploumpis, Irene Kotsia, and Stefanos P Zafeiriou. Fast-ganfit: Generative adversarial network for high fidelity 3d face reconstruction. IEEE Transactions on Pattern Analysis and Machine Intelligence, 2021.

[15] Partha Ghosh, Pravir Singh Gupta, Roy Uziel, Anurag Ranjan, Michael J. Black, and Timo Bolkart. GIF: Generative interpretable faces. In International Conference on 3D Vision (3DV), pages 868-878, 2020.

[16] HavenFeng. Photometric flame fitting https://github.com/HavenFeng/photometric_optimization, 2019.

[17] Fangzhou Hong, Mingyuan Zhang, Liang Pan, Zhongang Cai, Lei Yang, and Ziwei Liu. Avatarclip: Zero-shot textdriven generation and animation of 3d avatars. ACM Transactions on Graphics (TOG), 41(4):1-19, 2022.

[18] Nikolay Jetchev. Clipmatrix: Text-controlled creation of 3d textured meshes, 2021.

[19] Tero Karras, Timo Aila, Samuli Laine, and Jaakko Lehtinen. Progressive growing of GANs for improved quality, stability, and variation. In International Conference on Learning Representations, 2018.

[20] Tero Karras, Miika Aittala, Janne Hellsten, Samuli Laine, Jaakko Lehtinen, and Timo Aila. Training generative adversarial networks with limited data. In Proc. NeurIPS, 2020.

[21] Tero Karras, Samuli Laine, and Timo Aila. A style-based generator architecture for generative adversarial networks. In 2019 IEEE/CVF Conference on Computer Vision and Pattern Recognition (CVPR), pages 4396-4405, 2019.

[22] Tero Karras, Samuli Laine, Miika Aittala, Janne Hellsten, Jaakko Lehtinen, and Timo Aila. Analyzing and improving the image quality of StyleGAN. In Proc. CVPR, 2020.

[23] Nasir Mohammad Khalid, Tianhao Xie, Eugene Belilovsky, and Popa Tiberiu. Clip-mesh: Generating textured meshes from text using pretrained image-text models. December 2022.

[24] Umut Kocasari, Alara Dirik, Mert Tiftikci, and Pinar Yanardag. Stylemc: Multi-channel based fast text-guided image generation and manipulation. In Proceedings of the IEEE/CVF Winter Conference on Applications of Computer Vision (WACV), pages 895-904, January 2022.

[25] Marek Kowalski, Stephan J. Garbin, Virginia Estellers, Tadas Baltrusaitis, Matthew Johnson, and Jamie Shotton. Config: Controllable neural face image generation. In European Conference on Computer Vision (ECCV), 2020.

[26] Samuli Laine, Janne Hellsten, Tero Karras, Yeongho Seol, Jaakko Lehtinen, and Timo Aila. Modular primitives for high-performance differentiable rendering. ACM Transactions on Graphics, 39(6), 2020.

[27] Alexandros Lattas, Stylianos Moschoglou, Baris Gecer, Stylianos Ploumpis, Vasileios Triantafyllou, Abhijeet Ghosh, and Stefanos Zafeiriou. Avatarme: Realistically renderable 3d facial reconstruction "in-the-wild". In Proceedings of the IEEE/CVF Conference on Computer Vision and Pattern Recognition (CVPR), June 2020.

[28] Alexandros Lattas, Stylianos Moschoglou, Stylianos Ploumpis, Baris Gecer, Abhijeet Ghosh, and Stefanos P Zafeiriou. Avatarme++: Facial shape and brdf inference with photorealistic rendering-aware gans. IEEE Transactions on Pattern Analysis and Machine Intelligence, 2021.

[29] Myunggi Lee, Wonwoong Cho, Moonheum Kim, David I. Inouye, and Nojun Kwak. Styleuv: Diverse and high-fidelity uv map generative model. ArXiv, abs/2011.12893, 2020.

[30] Tianye Li, Timo Bolkart, Michael. J. Black, Hao Li, and Javier Romero. Learning a model of facial shape and expression from 4D scans. ACM Transactions on Graphics, (Proc. SIGGRAPH Asia), 36(6): 194:1-194:17, 2017.

[31] Yuchen Liu, Zhixin Shu, Yijun Li, Zhe Lin, Richard Zhang, and S. Y. Kung. 3d-fm gan: Towards 3d-controllable face manipulation. ArXiv, abs/2208.11257, 2022.

[32] Matthew Loper, Naureen Mahmood, Javier Romero, Gerard Pons-Moll, and Michael J. Black. SMPL: A skinned multi-person linear model. ACM Trans. Graphics (Proc. SIGGRAPH Asia), 34(6):248:1-248:16, October 2015.

[33] Huiwen Luo, Koki Nagano, Han-Wei Kung, Qingguo Xu, Zejian Wang, Lingyu Wei, Liwen Hu, and Hao Li. Normalized avatar synthesis using stylegan and perceptual refinement. In Proceedings of the IEEE/CVF Conference on Computer Vision and Pattern Recognition (CVPR), pages 11662-11672, June 2021.

[34] Richard T. Marriott, Sami Romdhani, and Liming Chen. A 3d gan for improved large-pose facial recognition. 2021 IEEE/CVF Conference on Computer Vision and Pattern Recognition (CVPR), pages 13440-13450, 2021.

[35] Oscar Michel, Roi Bar-On, Richard Liu, Sagie Benaim, and Rana Hanocka. Text2mesh: Text-driven neural stylization for meshes. In Proceedings of the IEEE/CVF Conference on Computer Vision and Pattern Recognition (CVPR), pages 13492-13502, June 2022.

[36] Or Patashnik, Zongze Wu, Eli Shechtman, Daniel Cohen-Or, and Dani Lischinski. Styleclip: Text-driven manipulation of stylegan imagery. In Proceedings of the IEEE/CVF International Conference on Computer Vision (ICCV), pages 2085-2094, October 2021.

[37] Mathis Petrovich, Michael J. Black, and Gül Varol. TEMOS: Generating diverse human motions from textual descriptions. In European Conference on Computer Vision (ECCV), 2022.

[38] Alec Radford, Jong Wook Kim, Chris Hallacy, Aditya Ramesh, Gabriel Goh, Sandhini Agarwal, Girish Sastry, Amanda Askell, Pamela Mishkin, Jack Clark, Gretchen Krueger, and Ilya Sutskever. Learning transferable visual models from natural language supervision. In Marina Meila and Tong Zhang, editors, Proceedings of the 38th International Conference on Machine Learning, volume 139 of Proceedings of Machine Learning Research, pages 8748-8763. PMLR, 18-24 Jul. 2021.

[39] Aditya Ramesh, Prafulla Dhariwal, Alex Nichol, Casey Chu, and Mark Chen. Hierarchical text-conditional image generation with clip latents, 2022.

[40] Aditya Ramesh, Mikhail Pavlov, Gabriel Goh, Scott Gray, Chelsea Voss, Alec Radford, Mark Chen, and Ilya Sutskever. Zero-shot text-to-image generation, 2021.

[41] Nataniel Ruiz, Yuanzhen Li, Varun Jampani, Yael Pritch, Michael Rubinstein, and Kfir Aberman. Dreambooth: Fine tuning text-to-image diffusion models for subject-driven generation. 2022.

[42] Ron Slossberg, Ibrahim Jubran, and Ron Kimmel. Unsupervised high-fidelity facial texture generation and reconstruction. arXiv preprint arXiv:2110.04760, 2021.

[43] Ayush Tewari, Mohamed Elgharib, Gaurav Bharaj, Florian Bernard, Hans-Peter Seidel, Patrick Perez, Michael Zöllhofer, and Christian Theobalt. Stylerig: Rigging style-gan for 3d control over portrait images, cvpr 2020. In IEEE Conference on Computer Vision and Pattern Recognition (CVPR). IEEE, June 2020.

[44] Ayush Tewari, Mohamed Elgharib, Mallikarjun B R, Florian Bernard, Hans-Peter Seidel, Patrick Perez, Michael Zollhöfer, and Christian Theobalt. Pie: Portrait image embedding for semantic control. ACM Trans. Graph., 2020.

[45] Kim Youwang, Kim Ji-Yeon, and Tae-Hyun Oh. Clip-actor: Text-driven recommendation and stylization for animating human meshes. In ECCV, 2022.

[46] zllrunning. face-parsing.pytorch. https://github.com/zllrunning/face-parsing.PyTorch, 2018.

The invention claimed is:

1. A method for user command-guided editing of an initial textured 3D morphable model of an object comprising:
    obtaining the initial textured 3D morphable model of the object comprising an initial texture map of the object and an initial 3D mesh model of the object; and
    determining an edited texture map of the object corresponding to the user command by editing the initial texture map of the object based on a first artificial neural network; and/or
    determining an edited 3D mesh model of the object corresponding to the user command by editing the initial 3D mesh model of the object based on a second artificial neural network; and
    generating an edited textured 3D morphable model of the object corresponding to the user command based on the edited texture map of the object and/or the edited 3D mesh model of the object,
    wherein the edited texture map is determined by a third artificial neural network based on a sum of the initial texture latent code and an offset texture latent code,
    wherein the third artificial neural network is trained by adversarial self-supervised training on a plurality of two-dimensional RGB images using differentiable rendering.

2. The method of claim 1, further comprising:
generating the initial texture map of the object and a corresponding initial texture latent code based on a third artificial neural network; and/or
generating the initial 3D mesh model of the object based on an initial general appearance parameter of the 3D mesh model.

3. The method of claim 2, further comprising:
determining the offset texture latent code based on the initial texture latent code by the first artificial neural network corresponding to the user command; and/or
determining an offset general appearance parameter of the 3D mesh model based on the initial texture latent code by the second artificial neural network corresponding to the user command, and determining the edited 3D mesh model of the object based on the offset general appearance parameter.

4. The method of claim 2,
wherein the object is a human face, and the initial 3D mesh model is a FLAME model and the initial general appearance parameter of the 3D mesh model is linear expression coefficients; and/or
wherein the object is a human person or parts thereof, and the initial 3D mesh model is a SMPL-X model, and the initial general appearance parameter of the 3D mesh model is a jaw joint parameter, finger joints parameter, remaining body joints parameter, combined body, face, hands shape parameters and/or facial expression parameters.

5. The method of claim 1, wherein the first artificial neural network and/or the second artificial neural network are trained based on one or more texture maps and corresponding texture latent codes, wherein the texture maps and corresponding texture latent codes are generated based on a third artificial neural network.

6. The method of claim 5, wherein the third artificial neural network is trained by an adversarial self-supervised training.

7. The method of claim 6, wherein the third artificial neural network is trained based on a plurality of RGB images.

8. The method of claim 1, wherein the first artificial neural network and/or the second artificial neural network are trained with regards to a loss function which is based on a pre-trained vision-language model supervision and the user command.

9. The method of claim 8, wherein a difference measure is determined between the user command and a descriptive text, which is generated by the pre-trained vision-language model, of a visual context in a rendered image based on the edited textured 3D morphable model of the object.

10. The method of claim 8, wherein the first artificial neural network and/or the second artificial neural network are trained based on a plurality of different user commands.

11. The method of claim 1, further comprising:
rendering the edited texture map of the object or the initial texture map of the object together with the edited 3D mesh model of the object or the initial 3D mesh model of the object to obtain an image corresponding to the user command.

12. The method of claim 1, further comprising
transcribing the user command, which is a speech input in human language, into a text.

13. The method of claim 1, further comprising:
obtaining a plurality of different initial 3D mesh models of the object; and
determining a plurality of edited texture maps of the object corresponding to the plurality of the initial 3D mesh models of the object and the user command by jointly editing the initial texture map of the object a plurality of times based on the first artificial neural network and based on and the plurality of initial 3D mesh models; and
generating a plurality of edited textured 3D morphable models of the object corresponding to the user command based on the edited texture maps of the object and on the plurality of initial 3D mesh models of the object; and
rendering the plurality of edited texture maps of the object together with the plurality of initial 3D mesh models of the object to obtain a plurality of images corresponding to the user command.

14. A non-transitory computer-readable storage medium storing computer-readable instructions thereon which, when executed by a computer, cause the computer to carry out the steps of claim 1.

15. An electronic device for performing a user command-guided editing of an initial textured 3D morphable model, comprising:

processing circuitry configured to
obtain the initial textured 3D morphable model of the object comprising an initial texture map of the object and an initial 3D mesh model of the object; and
determine an edited texture map of the object corresponding to the user command by editing the initial texture map of the object based on a first artificial neural network; and/or
determine an edited 3D mesh model of the object corresponding to the user command by editing the initial 3D mesh model of the object based on a second artificial neural network (E); and
generate an edited textured 3D morphable model of the object corresponding to the user command based on the edited texture map of the object and/or the edited 3D mesh model of the object,
wherein the edited texture map is determined by a third artificial neural network based on a sum of the initial texture latent code and an offset texture latent code,
wherein the third artificial neural network is trained by adversarial self-supervised training on a plurality of two-dimensional RGB images using differentiable rendering.

16. A method for user command-guided editing of an initial textured 3D morphable model of an object comprising:
obtaining the initial textured 3D morphable model of the object comprising an initial texture map of the object and an initial 3D mesh model of the object; and
determining an edited texture map of the object corresponding to the user command by editing the initial texture map of the object based on a first artificial neural network; and/or
determining an edited 3D mesh model of the object corresponding to the user command by editing the initial 3D mesh model of the object based on a second artificial neural network; and
generating an edited textured 3D morphable model of the object corresponding to the user command based on the edited texture map of the object and/or the edited 3D mesh model of the object,
wherein the third artificial neural network is trained using both a full-image discriminator and a patch discriminator that evaluates texture patches to generate high-frequency texture details.

* * * * *